(12) United States Patent
Yeung et al.

(10) Patent No.: US 10,318,676 B2
(45) Date of Patent: Jun. 11, 2019

(54) TECHNIQUES FOR STATISTICAL FREQUENCY ENHANCEMENT OF STATICALLY TIMED DESIGNS

(71) Applicant: Ampere Computing LLC, Santa Clara, CA (US)

(72) Inventors: Alfred Yeung, Fremont, CA (US); Subbayyan Venkatsan, San Jose, CA (US); Hamid Partovi, Menlo Park, CA (US); Vamsi Srikantam, San Ramon, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 76 days.

(21) Appl. No.: 15/414,739

(22) Filed: Jan. 25, 2017

(65) Prior Publication Data
US 2018/0210987 A1 Jul. 26, 2018

(51) Int. Cl.
*G06F 9/455* (2018.01)
*G06F 17/50* (2006.01)

(52) U.S. Cl.
CPC ...... *G06F 17/5031* (2013.01); *G06F 17/5045* (2013.01); *G06F 17/5081* (2013.01)

(58) Field of Classification Search
USPC .................. 716/108, 110, 113, 132
See application file for complete search history.

(56) References Cited

U.S. PATENT DOCUMENTS

| | | | |
|---|---|---|---|
| 8,407,640 | B2 | 3/2013 | Le et al. |
| 8,656,331 | B1 | 2/2014 | Sundareswaran et al. |
| 8,713,501 | B1 | 4/2014 | Le et al. |
| 8,788,995 | B1 * | 7/2014 | Kumar ............... G06F 17/5031 716/110 |
| 8,806,413 | B2 | 8/2014 | Shaikh et al. |
| 8,843,864 | B2 | 9/2014 | Le et al. |

(Continued)

FOREIGN PATENT DOCUMENTS

EP 2899654 A1 7/2015

OTHER PUBLICATIONS

International Search Report and Written Opinion for corresponding International Application No. PCT/US2018/014337, dated Jun. 21, 2018, 12 pages.

*Primary Examiner* — Brian Ngo
(74) *Attorney, Agent, or Firm* — Alston & Bird LLP

(57) ABSTRACT

Techniques efficiently improve an integrated circuit design by simultaneously analyzing timing paths of the circuit design. A design management component can access data relating to the integrated circuit design from a design database. The design management component can perform a static timing analysis of the integrated circuit design and generate a timing path distribution, filtered analytics, and/or a probability density function associated with the integrated circuit design, wherein all of the timing paths of the integrated circuit design can be evaluated. The design management component can determine a modification to make to a cell, device, interconnection between cells or devices, or another element(s) of the integrated circuit design, based at least in part on the static timing analysis, the timing path distribution, the filtered analytics, and/or the probability density function, to generate a modified integrated circuit design, in accordance with defined design criteria.

13 Claims, 10 Drawing Sheets

(56) References Cited

U.S. PATENT DOCUMENTS

| | | | |
|---|---|---|---|
| 8,863,052 B1 | 10/2014 | Dhuria et al. | |
| 8,875,082 B1 | 10/2014 | Sircar et al. | |
| 9,183,333 B2 | 11/2015 | Shebaita | |
| 9,245,071 B2 | 1/2016 | Katz et al. | |
| 9,405,882 B1 | 8/2016 | Dhuria et al. | |
| 9,483,597 B1 | 11/2016 | Das et al. | |
| 9,875,333 B1* | 1/2018 | Verma | G06F 17/5081 |
| 2004/0068706 A1* | 4/2004 | Sivaraman | G06F 17/5045 |
| | | | 716/108 |
| 2004/0230921 A1* | 11/2004 | Hathaway | G06F 17/505 |
| | | | 716/132 |
| 2009/0070715 A1* | 3/2009 | Curtin | G06F 17/5031 |
| | | | 716/132 |
| 2010/0229137 A1* | 9/2010 | Liu | G06F 17/5031 |
| | | | 716/113 |
| 2012/0102448 A1 | 4/2012 | Haugestuen et al. | |
| 2015/0370955 A1* | 12/2015 | Ahlen | G06F 17/5031 |
| | | | 716/113 |
| 2017/0046469 A1* | 2/2017 | Rao | G06F 17/5031 |

* cited by examiner

TECHNIQUES FOR STATISTICAL FREQUENCY ENHANCEMENT OF STATICALLY TIMED DESIGNS

TECHNICAL FIELD

The subject disclosure relates generally to integrated circuit design, e.g., to techniques for statistical frequency enhancement of statically timed designs.

BACKGROUND

Certain methods for improving timing of a circuit design can involve corner-based analysis through static timing, or can take into account process variation and can consider statistical properties of underlying cells in the circuit design, for example. However, such methods can be inefficient. For instance, methods that can involve corner-based analysis through static timing can be inefficient, in part, because they do not take process variation into account. Other types of methods, which can take into account process variation and can consider statistical properties of underlying cells in the circuit design, can be inefficient, for example, due to employing undue amounts of pessimism with regard to the circuit design and/or using an undesirable amount of time to generate cell-related information in connection with a circuit design.

The above-described description is merely intended to provide a contextual overview of current methods associated with integrated circuit design and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

Certain methods for constructing an integrated circuit design can be inefficient, as such methods, which can involve corner-based analysis through static timing, do not take process variation into account, and other types of methods, which can take into account process variation and can consider statistical properties of underlying cells in the circuit design, typically end up employing undue amounts of pessimism with regard to the circuit design and/or use an undesirable (e.g., unnecessarily large) amount of information related to a cell, and correspondingly, using an undesirable (e.g., unnecessarily large) amount of time to generate cell-related information in connection with an integrated circuit design. Further, such methods also can be inefficient as the corner-based analysis analyzes only the worst mean value of the integrated circuit design, and the other types of methods analyze only the worst mean plus N*sigma value of the integrated circuit design.

In an effort to overcome these and/or other deficiencies, in an example embodiment, disclosed herein is a system for analyzing timing paths for improving design timing. The system comprises a data store that stores a design database comprising information relating to a design of integrated circuitry. The system also comprises a design management component that accesses the information relating to the design and determines a subset of the timing paths associated with the design that do not satisfy defined design criteria relating to performance of the integrated circuitry based at least in part on an analysis of the timing paths associated with the design, wherein the subset of the timing paths comprises at least a first timing path and a second timing path, and wherein the design management component modifies at least one element associated with the subset of the timing paths to generate a modified design of the integrated circuitry that improves performance of the first timing path and the second timing path to satisfy the defined design criteria.

In another example embodiment, disclosed herein is a method for analyzing timing paths for design timing enhancement. The method involves determining, by a system comprising a processor, a subset of the timing paths associated with an integrated circuit design of an integrated circuit that do not satisfy defined design criteria relating to performance of the integrated circuit design based at least in part on simultaneously analyzing the timing paths of the integrated circuit design, wherein the subset of the timing paths comprises at least a first timing path and a second timing path. The method also can comprise, in response to determining that the subset of the timing paths do not satisfy the defined design criteria, modifying, by the system, at least one element associated with the subset of the timing paths to generate a modified integrated circuit design that satisfies the defined design criteria and provides an enhanced performance relative to the performance of the integrated circuit design.

In yet another example embodiment, disclosed herein is a device for analyzing timing paths for design timing enhancement. The device comprises a data store that stores a design database comprising data relating to a design of integrated circuitry. The system also can include a design management component that accesses the information relating to the design and determines a subset of the timing paths of the design that do not satisfy defined design criteria relating to performance of the integrated circuitry based at least in part on an analysis of the timing paths associated with the design, wherein the subset of the timing paths comprises at least a first timing path and a second timing path, wherein the design management component modifies at least one element associated with the subset of the timing paths to generate a modified design of the integrated circuitry that improves performance of the first timing path and the second timing path to satisfy the defined design criteria, and wherein the design management component performs a static timing analysis of the design and generates at least one of a timing path distribution, filtered analytics, or a design probability density function associated with the design, to facilitate determining at least one modification to make to the at least one element to generate the modified design.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
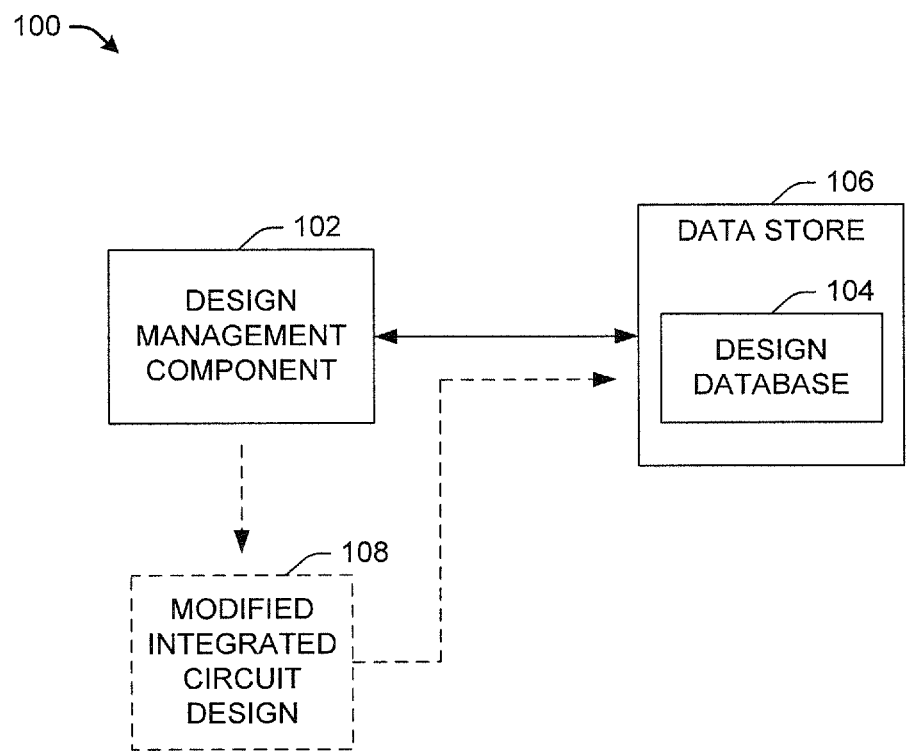
FIG. 1 illustrates a block diagram of an example, non-limiting system that can efficiently enhance a design of a circuit, in accordance with various aspects and embodiments of the disclosed subject matter.

The disclosure herein is described with reference to the drawings, wherein like reference numerals are used to refer to like elements throughout. In the following description, for purposes of explanation, numerous specific details are set forth in order to provide a thorough understanding of the disclosed subject matter. It may be evident, however, that various disclosed aspects can be practiced without these specific details. In other instances, well-known structures and devices are shown in block diagram form in order to facilitate describing the disclosed subject matter.

One type of method employed to improve the timing of a particular circuit design can involve a corner-based analysis through static timing. The circuit design can be improved around a particular pre-defined process-voltage-temperature (PVT) "corner" with a target clock period. This method considers process variation by assuming all devices are locked to a specific variation point. While this method can work adequately on certain designs, it does not take into account for process variation, and it is known to be very pessimistic, which can make this method undesirably ineffective and inefficient.

Another method can consider process variation by applying a generic on-chip-variation (OCV) margin to the circuit design to try to improve the circuit design. It can consider the statistical properties of underlying cells in the circuit design. This method can add to the target clock period without necessarily examining the construction of the circuit design. While this method may help achieve a slightly improved correlation in silicon than without applying this margin, the circuit design may not necessarily be optimized or desirably improved.

Still another method for margining in connection with circuit design is known as advanced on-chip-variation (AOCV) margining. This method can consider statistical properties of underlying cells in the circuit design, as well as the circuit design, to determine an amount of margining and its methods of improving the target. While, in theory, this AOCV method may improve the circuit design, the implementation of this AOCV method in CAD tools, however, can lead to large and/or unduly unnecessary amounts of pessimism with respect to the circuit design. This associated pessimism can render this AOCV method undesirably ineffective for improvement or optimization of the circuit design.

Yet another method for margining in connection with circuit design is known as parametric on-chip-variation (POCV) margining. This method can consider the statistical properties of underlying cells in the circuit design and can apply it on a per cell basis to the circuit design to try to improve the circuit design. The POCV method can be somewhat useful to improve a circuit design, however, for the POCV method, an undesirable (e.g., a tremendous or unnecessarily large) amount of information related to a cell typically is used in order to achieve the circuit design. The amount of time required to generate the needed cell-related information (e.g., the undesirably large amount of cell-related information) can make this POCV method undesirably inefficient.

As the complexity and scope of circuit design increases with each process technology migration, it can be insufficient to merely monitor the critical path of a clock domain with some amount of margining.

To that end, presented are techniques that can improve circuit design by analyzing process variation for design timing enhancement (e.g., optimization) that can consider all paths or at least a desired portion of paths in the circuit design by applying probability theory to each timing path or a desired portion of timing paths. By analyzing the circuit design from different and/or additional perspectives than other types of methods, the disclosed techniques can allow and provide for different and enhanced ways of improving a circuit design.

A design management component can generate static timing analysis (STA) data and associated process variation information from a design database. The design management component can analyze and capture all desired (e.g., critical) timing in the circuit design, in contrast to other methods that merely analyze the worst mean value of a circuit design, such as in the corner-based STA method, or the worst mean plus N*sigma value of a circuit design, such as in the AOCV or POCV STA methods, wherein N can be virtually any desired real number (e.g., 1.0, 1.1, 1.2, . . . , 2.0, 3.0, . . . ; −1.0, −1.1, −1.2, . . . , −2.0, −3.0, . . . ). Since the nature of silicon frequency prediction can be such that paths are affected differently from each silicon part, it can be undesirable and inefficient to examine solely the worst (e.g., slowest) timing path. The design management component, by analyzing all or a desired portion of paths (e.g., a desired portion of paths beyond the paths analyzed by other types of methods), can inspect and evaluate the scope of the circuit design in its entirety or at least to a significant degree (e.g., beyond the scope of evaluation of a circuit design using other types of methods).

The design management component can assign respective correlated timing paths as independent variables to seed the analysis in connection with the circuit design. The design management component can assign the respective correlated timing paths based at least in part on the size of the design database (e.g., the amount and type of information contained in the design database), the effective runtime, and the level of accuracy in the circuit design that is desired. The assigning of the respective correlated timing paths by design management component can vary from taking divergent points from the clock distribution of the circuit design and marking each path as independent to assigning each gate in the circuit design as being independent. Based at least in part on this independent variable assignment, the design management component can determine and/or generate the timing path distribution for the circuit design and filtered analytics of the independent variables. Timing path distribution can relate to (e.g., can be an abbreviated version of) the timing paths, which can be represented by the mean, sigma, and the population and/or density of each independent variable with regard to the circuit design. This can provide circuit designers a better (e.g., clearer) look at where the timing paths of the circuit are located or concentrated, and can be quite useful for identifying timing path outliers to facilitate improvement or optimization of the circuit design.

The design management component can perform filtered analytics on the independent variables to link the independent variables back to respective timing paths. The design management component can determine the filtered analytics based at least in part on a multitude of factors, including the qualifiers for variable assignment, frequency or variation weighed instance mapping, and cell types (e.g., voltage threshold (VT) of a cell, channel length of a cell, and/or drive strength of a cell). The filtered analytics can be used to facilitate performing design optimization in accordance with an optimization algorithm (e.g., statistical frequency optimization or design optimization algorithm).

As part of the algorithm, the design management component can assign a respective random number to each of the timing paths in the timing path distribution in order to generate a respective sampled value of each timing path. These timing paths can all be part of the same clock domain, with the maximum period being used to set the maximum frequency. Therefore, the design management component can use the maximum sampled value of timing paths in the distribution to define the frequency of a single part. The design management component can repeat this sampling method over a statistically significant number of parts to guarantee a desirably accurate reflection of the probability density function. The design management component can plot the period, or 1/frequency of the circuit design, against the probability in which it occurs, which can be the design probability density function associated with the integrated circuit design. The design management component can use the plot directly to correlate against silicon, in various ways. For instance, the design management component can analyze and use the peak of the plot to identify the likely frequency, can use the area under the curve of the plot to identify the percentage of parts over a certain frequency, or can use the curve itself to match the silicon tested frequency, or any desired combination thereof.

In accordance with the optimization algorithm, the design management component can analyze information relating to the filtered analytics, the timing path distribution and the design probability density function. Based at least in part on the results of such analysis, the design management component can identify ways (e.g., modification of cells and/or devices, modification of connections between cells and/or devices) to improve the circuit design, thereby resulting in a more optimized circuit design. While the critical path frequency through corner-based, AOCV, or POCV techniques would remain identical, with regard to the disclosed subject matter, the design probability density function of the integrated circuit design produced by the design management component can shift most of its weight to a higher frequency. This can result in a higher number of parts (e.g., cells, devices) of the integrated circuit design achieving a desired frequency yield.

These and other aspects and implementations of the disclosed subject matter will now be described in connection with the figures.

FIG. 1 illustrates a block diagram of an example, non-limiting system 100 that can efficiently enhance a design of a circuit (e.g., an integrated circuit), in accordance with various aspects and embodiments of the disclosed subject matter. The system 100 and techniques disclosed herein can be employed, for example, with very-large-scale integration (VLSI) processes to efficiently design and create integrated circuits. For example, the system 100 can efficiently improve circuit design to predict and improve silicon operation frequency in connection with the design of an integrated circuit. The system 100 can enable circuit designers to project the design frequency for a circuit design considering all or a desired portion of the paths (e.g., timing paths) in the circuit design, as opposed to only being limited by the slowest path. This can allow the system 100 and/or the circuit designer to perform different types of optimization of the circuit design and/or design trade-offs that are not able to be done through other types of techniques (e.g., corner-based analysis, OCV, AOCV, POCV).

In connection with designing an integrated circuit, various types of cells can be employed to perform various functions of the integrated circuit, wherein respective cells can have respective characteristics (e.g., physical or logical characteristics or attributes). A cell(s) can be, can comprise, or can be part of electronic elements of an integrated circuit, wherein the electronic elements can comprise, for example, logic gates (e.g., AND gate, NAND gate, OR gate, NOR gate, XOR gate, XNOR gate, inverter gate, AND-OR-Invert gate, or other type of gate), multiplexer (MUX), demultiplexer (DEMUX), an adder component, a storage element (e.g., a flip-flop or latch element), etc.

The system 100 can comprise a design management component 102 that can be employed to perform design optimization to facilitate improving the design of an integrated circuit, which can comprise a set of cells, in accordance with various aspects and embodiments of the disclosed subject matter. For instance, the design management component 102 can employ a statistical frequency optimization methodology (SFOM) or techniques of statically timed circuit designs to facilitate improving the design of an integrated circuit (e.g., improving the circuit layout of the cells of the integrated circuit), in accordance with defined design criteria. The SFOM can be or can comprise, for example, a statistical frequency optimization or design optimization algorithm.

The defined design criteria can relate to performance of an integrated circuit design. For example, the defined design criteria can indicate a level, type, or conditions of performance of an integrated circuit design that is or are considered desirable (e.g., suitable, acceptable, optimal).

Figure 2:
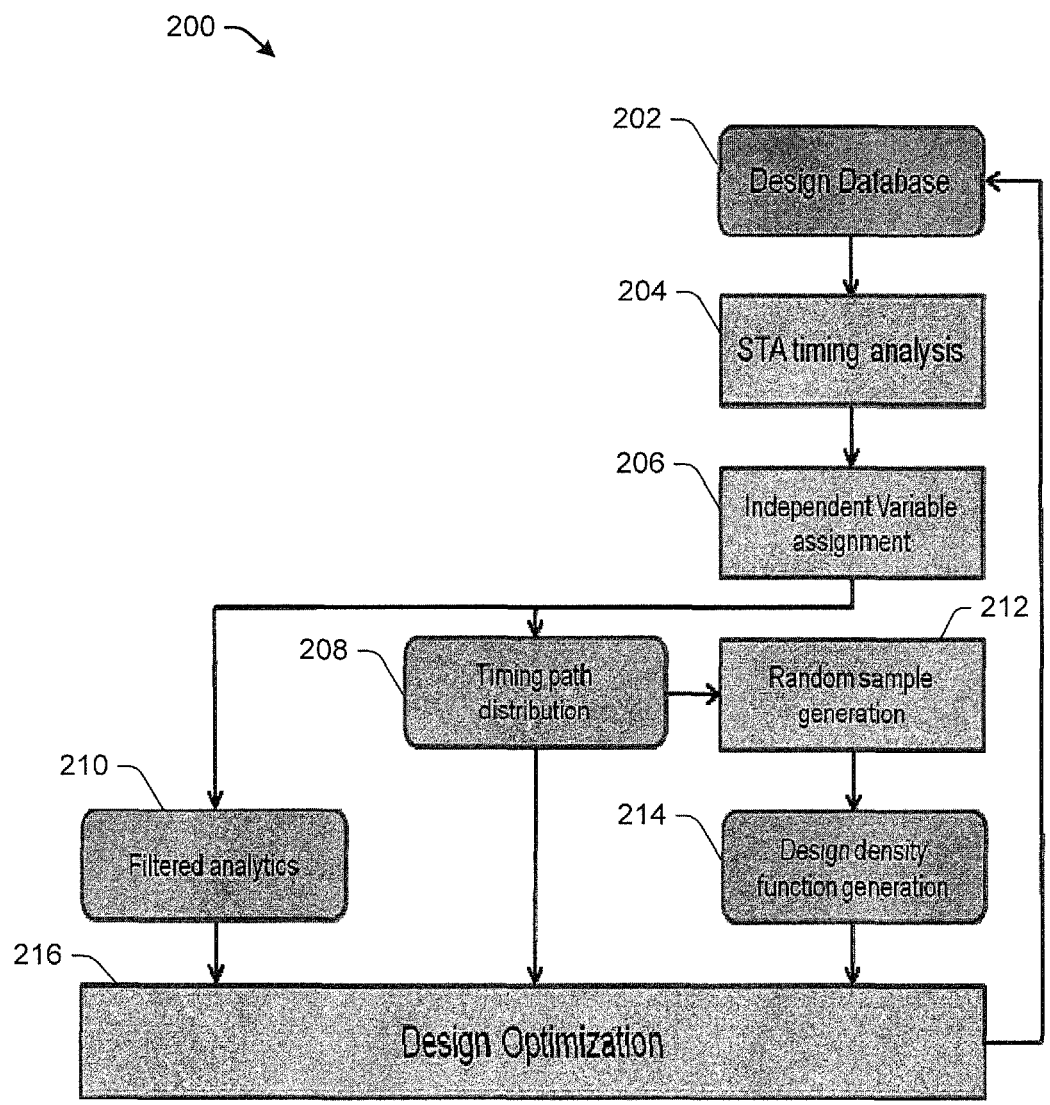
FIG. 2 depicts a block diagram of an example, non-limiting process flow that can efficiently enhance a design of an integrated circuit, in accordance with various aspects and embodiments of the disclosed subject matter.

Referring to FIG. 2 (along with FIG. 1), FIG. 2 depicts a block diagram of an example, non-limiting process flow 200 that can efficiently enhance a design of an integrated circuit, in accordance with various aspects and embodiments of the disclosed subject matter. The process flow 200 can relate to the SFOM that can be employed (e.g., by the design management component 102) to improve an integrated circuit design, in accordance with the defined design criteria.

In accordance with the process flow 200, at block 202, a design database associated with an integrated circuit design can be accessed. The design management component 102 can access the design database 104 that can be stored in a data store 106 associated with (e.g., connected to) the design management component 102, wherein the design database 104 can comprise information relating to an integrated circuit design or for use in designing an integrated circuits, wherein such information can include information relating to the cells, elements, and/or devices utilized in the design of the integrated circuit, the layout of cells, elements, and/or devices, interrelationships (e.g., interconnections) between the various cells, elements, and/or devices, etc.

In accordance with the process flow 200, at block 204, an analysis, including an STA analysis, can be performed on the information obtained from the design database 202. The design management component 102 can analyze the information relating to the integrated circuit design obtained from the design database 104. As part of the analysis, the design management component 102 can perform the STA analysis of the integrated circuit design based at least in part on the information relating to the integrated circuit design. The STA analysis is a simulation technique that can be employed to determine an expected timing of all or a portion of an integrated circuit, wherein there can be respective timing paths associated with respective elements (e.g., cells, devices) of the integrated circuit, and wherein the respective timing paths can have respective timing values associated with them.

Also, as part of the analysis of the information, the design management component 102 can identify respective characteristics (e.g., physical or logical characteristics or attributes) of respective cells. The characteristics of the cells can comprise, for example, height of a cell, channel width of a cell, voltage threshold (VT) doping of a cell, stack height of a cell, and/or other desired cell characteristics.

Based at least in part on the results of the analysis, the design management component 102 can generate STA data and associated variation information (e.g., variation profiles) associated with the cells and respectively associated timing paths in connection with the integrated circuit design. The respective variation profiles of the respective cells can comprise information relating to, for example, respective process variations associated with the respective cells (e.g., the variations in characteristics of the respective cells, the variations in how the respective cells react under certain conditions). The STA data can comprise, for example, a timing report obtaining from the STA timing analysis performed by the design management component 102. From the information in the design database 104, the design management component 102 can generate the time relationships (e.g., timing paths) between any sequential elements (e.g., sequential cells) that exist in the design database 104.

Depending on the integrated circuit design, the structure of the cells and timing paths, and the interrelationships (e.g., connections) between cells and timing paths, can significantly vary. For example, in a particular integrated circuit design, there can be a timing path (or more than one timing path) that can have a starting pointing associated with a first cell and an end point associated with a second cell, with no other connections to other cells or other timing paths along that timing path. As another example, in a particular integrated circuit design, there can be one or more timing paths that can have a starting point associated with a first cell, wherein respective timing paths of the one or more timing paths can be associated with one or more end points that can be respectively associated with (e.g., related to, or connected to) one or more cells, which may or may not be associated with (e.g., connected to) other cells that can be associated with other timing paths. For instance, one gate at the starting point of a timing path can be associated with the respective inputs (e.g., input ports) of 10 inverters at a first end point (or various end points) of the timing path and an input (e.g., input port) of an AND gate associated with a second end point of the timing path. Also, the output (e.g., output port) of the AND gate may be associated with one or more timing paths respectively associated with one or more respective sets of logic (e.g., sets of gates).

In analyzing an integrated circuit design, other types of techniques may only analyze the worst mean value (e.g., as in corner-based STA) or the worst mean plus N*sigma value (e.g., as in AOCV or POCV STA) of the integrated circuit design (e.g., the worst timing path having the worst mean value or worst mean plus N*sigma value). However, since the nature of silicon frequency prediction can be such that paths of an integrated circuit design can be affected differently from each silicon part, it can be insufficient and less optimal to examine solely the worst timing path. Further, depending on the integrated circuit design, and/or the target specifications, performance characteristics, or design goals desired for the integrated circuit designs (e.g., based on the defined design criteria), the worst timing path (e.g., the timing path having the worst mean value or worst mean plus N*sigma value) of an integrated circuit design may not be the most critical or important timing path, or may not be the only important timing path, of the integrated circuit design that is to be considered when determining whether the integrated circuit design is sufficiently desirable (e.g., suitable, acceptable, optimal), in accordance with the defined design criteria.

In contrast to other types of techniques, as part of the analysis, the design management component 102 can analyze all or a desired portion of the paths (e.g., timing paths) associated with the cells of the integrated circuit design simultaneously (e.g., at the same time) or at least substantially simultaneously, which can enable the design management component 102 and/or the designer to inspect and evaluate the integrated circuit design (e.g., the scope of the integrated circuit design) in its entirety. The design management component 102 can thus capture, analyze, and evaluate all or a desired portion of the critical timing (e.g., critical timing paths) in the integrated circuit design. A timing path can be determined (e.g., by the design management component 102 or designer) to be a critical timing path (e.g., a relatively more critical timing path), for example, when the timing path meets or satisfies a set of conditions relating to timing (e.g., timing criticality) associated with the integrated circuit design, in accordance with the defined design criteria. For instance, the design management component 102 can analyze and evaluate the worst mean value (e.g., worst mean timing value), the worst mean plus N*sigma value (e.g., worst mean plus N*sigma timing value), and/or other timing values (e.g., critical timing values) associated with the paths of the integrated circuit design (e.g., analyze and evaluate all or a desired portion of the critical timing paths of the integrated circuit design), wherein N can be virtually any desired real number (e.g., 1.0, 1.1, 1.2, . . . , 2.0, 3.0, . . . ; −1.0, −1.1, −1.2, . . . , −2.0, −3.0, . . . ). As an example, the design management component 102 can determine or recreate the mean value and/or mean plus N*sigma value for each timing path, or a desired portion of the timing paths, of the integrated circuit design. The design management component 102 can analyze and evaluate the respective mean values and/or mean plus N*sigma values of the respective timing paths of the integrated circuit design to facilitate determining which timing paths are critical timing paths and/or determining ways to improve the integrated circuit design (e.g., determine modifications to be made to cells or the circuit layout of the integrated circuit).

As part of the process flow 200, at block 206, an independent variable assignment can be performed. In some implementations, the design management component 102 can assign correlated timing paths of the integrated circuit design as independent variables to facilitate seeding the analysis. The procedure employed by the design management component 102 to assign timing paths as independent variables can be based at least in part on the size of the design database 104 (e.g., the number of elements (e.g., cells) in the design database 104), the effective runtime for the analysis of the circuit design, the level of accuracy desired for the analysis of the circuit design, and/or other factors, in accordance with the defined design criteria.

For example, the procedures employed by the design management component 102 to assign timing paths as independent variables can vary from taking divergent points from the clock distribution of the integrated circuit design and marking each path as independent to assigning each gate in the integrated circuit design as being independent to another desired assignment procedure, based at least in part on the applicable design criteria. For instance, when the design database 104 is larger (e.g., when the design database 104 comprises billions of circuit elements (e.g., cells or devices)), it may be prohibitive or otherwise undesirable to assign each element in the integrated circuit design as an independent variable. As a result, it can be determined that, instead of assigning all elements as independent variables, only certain elements or timing paths can be assigned as independent elements, which can make the effective runtime for the analysis of the circuit design more manageable (e.g., can reduce the effective runtime of the analysis), however, at the expense of accuracy of the analysis of the circuit design (e.g., the analysis of the circuit design can be less accurate). If the design database 104 is smaller, it may be the case that a higher percentage of elements or timing paths of the circuit design can be assigned as independent variables, while still achieving a desired effective runtime for the analysis of the circuit design, wherein the assignment of a higher percentage of elements or timing paths as independent variables typically can improve accuracy of the analysis of the integrated circuit design.

In accordance with the process flow 200, at block 208, a timing path distribution associated with the integrated circuit design can be produced, and at block 210, filtered analytics can be produced, based at least in part on the independent variable assignment. The design management component 102 can analyze the correlated timing paths or elements of the integrated circuit design that have been assigned as independent variables. Based at least in part of the results of such analysis, the design management component 102 can produce (e.g., generate) the timing path distribution and the filtered analytics of the independent variables. The timing path distribution can be an abbreviated (e.g., significantly abbreviated) version of the timing paths of the integrated circuit design, and can be represented by the mean, sigma, and population/density of each independent variable associated with a respective timing path or element(s).

Figure 3:
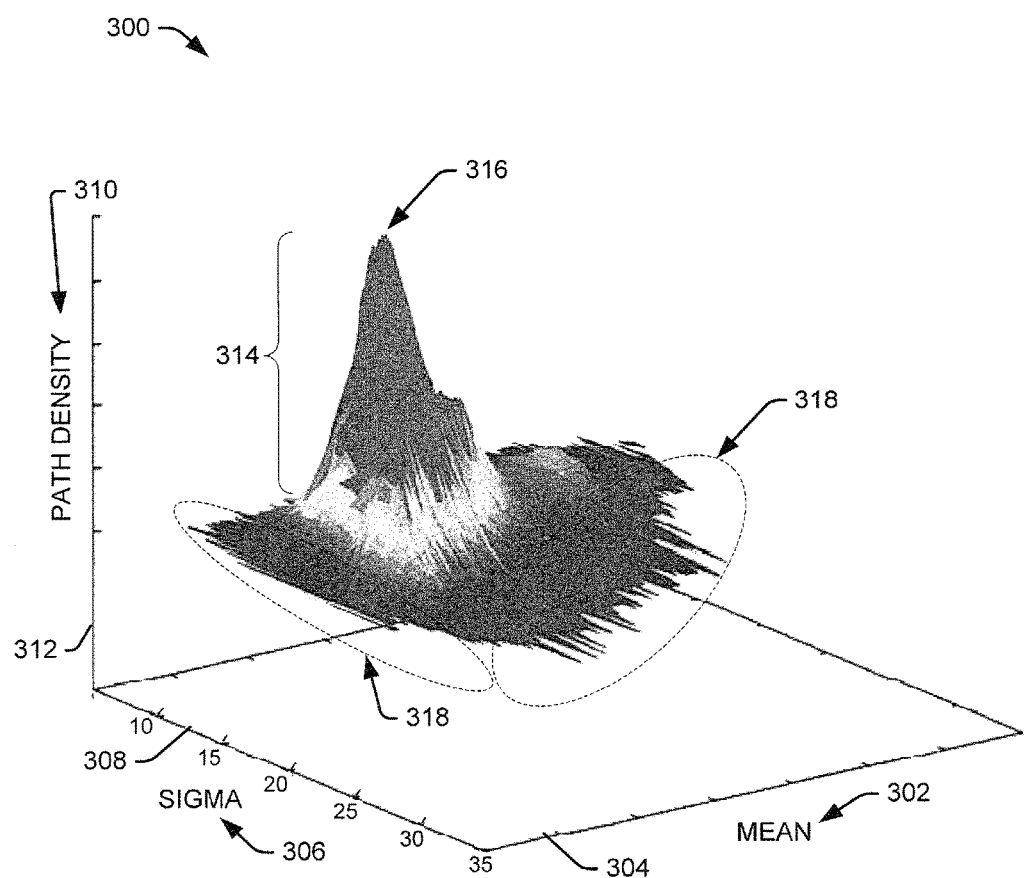
FIG. 3 presents a diagram of an example, non-limiting timing path distribution plot that can represent the mean, sigma, and population/density of each independent variable of the independent variables associated with the respective timing paths or elements of an integrated circuit design, in accordance with various aspects and embodiments of the disclosed subject matter.

Referring briefly to FIG. 3 (along with FIGS. 1 and 2), FIG. 3 presents a diagram of an example, non-limiting timing path distribution plot 300 that can represent the mean, sigma, and population/density of each independent variable of the independent variables associated with the respective timing paths or elements of an integrated circuit design, in accordance with various aspects and embodiments of the disclosed subject matter. The timing path distribution plot 300 can be a three-dimensional (3-D) plot with the mean 302 associated with the timing paths on a first axis 304 (e.g., x-axis)) of the plot 300, the sigma 306 associated the timing paths on a second axis 308 (e.g., z-axis) of the plot 300, and the path density 310 associated with the timing paths on a third axis 312 (e.g., y-axis) of the plot 300. The timing path distribution plot 300 can provide designers with a better (e.g., clearer) view of where the timing paths are located or concentrated, and can be useful for identifying outlier timing paths for optimization (e.g., identifying outlier timing paths to facilitate determining design modifications that can be made to the integrated circuit design to facilitate reducing outlier timing paths in the integrated circuit design in order to improve the integrated circuit design).

For example, as can be seen in the example timing path distribution plot 300, there is a portion 314 of the timing path distribution plot 300 that can be located in one area of the plot 300 and can have a high path density where there can be a higher concentration of timing paths (e.g., a higher number of timing paths per unit of area) located in that area relative to (e.g., as compared to) other areas of the plot 300. As also can be seen in the plot 300, there can be a peak 316 (or there can be more than one peak, depending on the particular timing path distribution plot associated with a particular integrated circuit design), wherein the peak 316 can be associated with the high path density area. The example timing path distribution plot 300 also can comprise one or more other portions 318 of the plot 300 where outlier timing paths can be located (e.g., one or more other portions 318 of the plot with a relatively low concentration of timing paths). The designer and/or the design management component 102 can analyze the example timing path distribution plot 300 to facilitate determining design modifications that can be made to the integrated circuit design to facilitate reducing outlier timing paths in the integrated circuit design and improving the integrated circuit design, as more fully disclosed herein.

With further regard to FIGS. 1 and 2, the design management component 102 can produce the filtered analytics based at least in part on the analysis of the correlated timing paths or elements of the integrated circuit design that have been assigned as independent variables. Filtered analytics can be a method or technique that can link the independent variables back to each of the timing paths, respectively, associated with the integrated circuit design. The design management component 102 and/or the designer can utilize the filtered analytics associated with an integrated circuit design to facilitate performing design optimization, in accordance with the defined algorithm (e.g., statistical frequency optimization or design optimization algorithm), to improve the integrated circuit design, as more fully described herein. The design management component 102 can determine the filtered analytics based at least in part on a multitude of factors, including, for example, the qualifiers for variable assignment, frequency or variation weighed instance mapping, and/or types of cells (e.g., VT of a cell, channel length of a cell, and/or drive strength of a cell) associated with the integrated circuit design.

In accordance with the process flow 200, at block 212, random number generation in connection with the timing paths of the integrated circuit design can be performed. The design management component 102 can associate or assign a random number to each of the timing paths of the timing path distribution associated with the integrated circuit design (e.g., the timing path distribution depicted in the timing path distribution plot 300 of FIG. 3) in order to facilitate generating a respective sampled value for each timing path associated with the timing path distribution associated with the integrated circuit design. These timing paths all can be part of the same clock domain, wherein the design management component 102 can use the maximum period associated with the integrated circuit design to set the maximum frequency. As a result, the design management component 102 can use the maximum sampled value of the timing paths in the timing path distribution to define the frequency of a single part (e.g., cell, device, element) of the integrated circuit design. The design management component 102 can repeat this sampling method over a statistically significant number of parts of the integrated circuit design to achieve or guarantee (e.g., guarantee to a desired degree of confidence or probability, such as, for example, a 90% or 95% or other desired percentage confidence level) a desirably accurate reflection of the probability density function (also referred herein to as the design probability density function) associated with the integrated circuit design, in accordance with the defined design criteria. The desired accuracy (e.g., defined acceptable, suitable, or optimal accuracy) of the probability density function associated with the integrated circuit design can be a level of accuracy that satisfies one or more conditions relating to (e.g., that can be indicative of) the accuracy of the probability density function, wherein the desired accuracy and the one or more conditions can be based at least in part on the defined design criteria applicable to the integrated circuit design.

As part of the process flow 200, at block 214, a design density function associated with the integrated circuit design can be generated, based at least in part on the timing path distribution and the random sample generation. The design management component 102 can analyze information obtained from or otherwise relating to performing the sampling method over the statistically significant number of parts of the integrated circuit design. Based at least in part on the results of such analysis, for each period, or each 1/frequency, of the integrated circuit design, the design management component 102 can generate a plot (e.g., a probability density function plot) of the period, or 1/frequency, of the integrated circuit design against the probability in which the period occurs, wherein such plot can be or represent the probability density function of the integrated circuit design.

Figure 4:
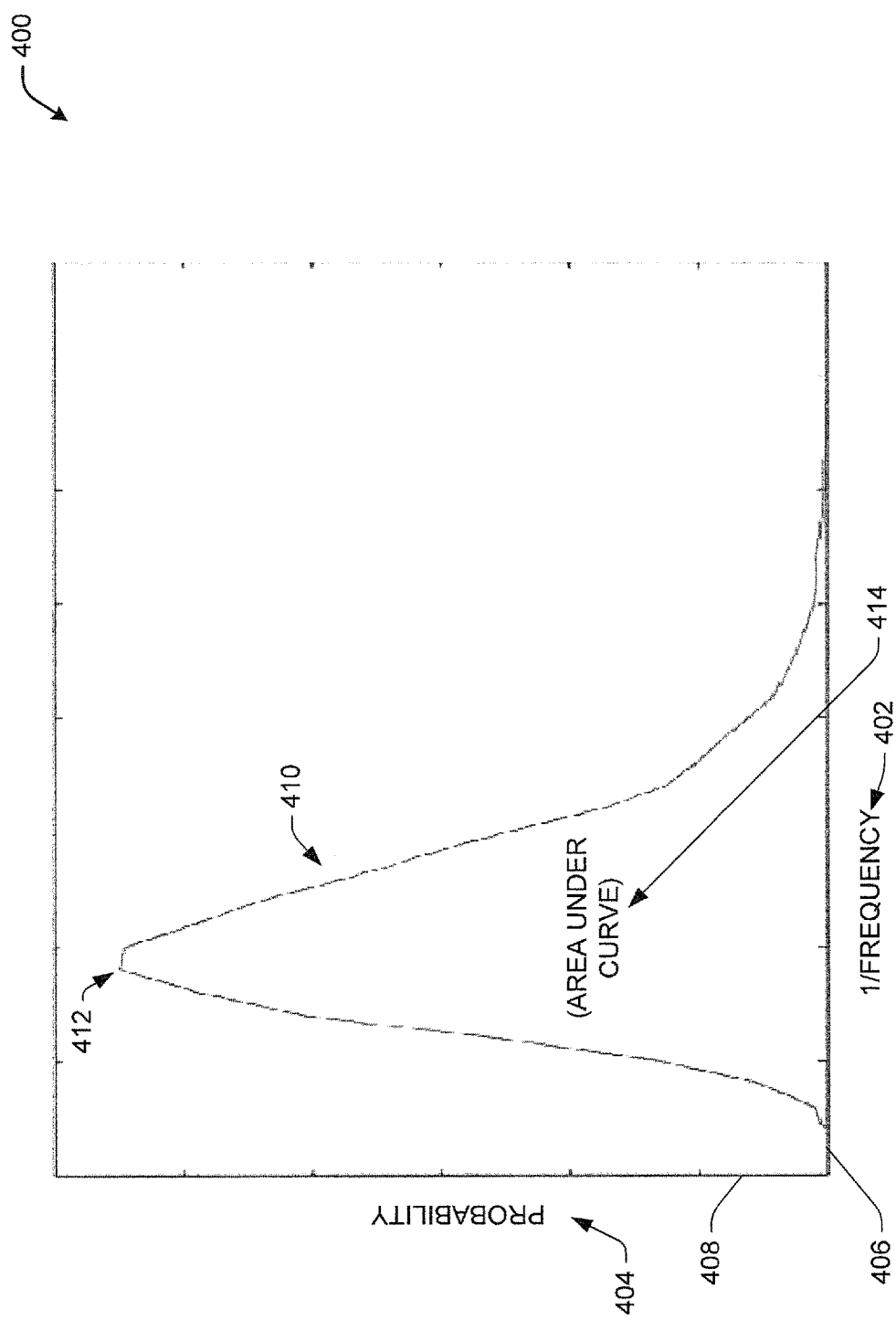
FIG. 4 depicts a diagram of an example non-limiting probability density function plot that can be or represent the probability density function across the parts of an integrated circuit design, in accordance with various aspects and embodiments of the disclosed subject matter.

In that regard, referring briefly to FIG. 4 (along with FIGS. 1 and 2), FIG. 4 depicts a diagram of an example non-limiting probability density function plot 400 that can be or represent the probability density function across the parts (e.g., cells, devices, elements) of an integrated circuit design, in accordance with various aspects and embodiments of the disclosed subject matter. The design management component 102 can generate the example probability density function plot 400. The probability density function plot 400 can be a plot of the 1/frequency 402 (e.g., the period) of the integrated circuit design against the probability 404 in which it occurs, wherein the 1/frequency 402 can be plotted along a first axis 406 (e.g., x-axis) of the probability density function plot 400 and the probability 404 can be plotted along a second axis 408 (e.g., y-axis) of the probability density function plot 400.

The probability density function plot 400 also can illustrate a curve 410 that can represent the 1/frequency 402 of the integrated circuit design against the probability 404 in which the 1/frequency 402 occurs. As can be observed in FIG. 4, there can be a peak 412 (or more than one peak, depending on the integrated circuit design or other factors) of the curve 410 of the probability density function. The probability density function plot 400 further can illustrate the area 414 under the curve 410 of the probability density function.

The design management component 102 and/or the designer can use the probability density function plot (e.g., plot 400) directly to correlate against silicon in various ways in connection with developing, determining, or modifying the design of the integrated circuit. For example, the design management component 102 and/or the designer can analyze the probability density function plot (e.g., plot 400) to determine or identify the curve (e.g., curve 410), the location of the curve in the plot, the peak (e.g., peak 412) of the curve (e.g., curve 410), and/or the area (e.g., area 414) under the curve. The design management component 102 and/or the designer can use information relating to the peak (e.g., peak 412) of the curve (e.g., the probability value and/or the 1/frequency value, and/or a combination thereof) to facilitate determining or identifying the frequency or likely frequency (e.g., the frequency with the highest path density) associated with the integrated circuit design.

The design management component 102 and/or the designer also can use information relating to the area (e.g., area 414) under the curve (e.g., the amount and/or location of the area under the curve of the probability density function) to determine or identify the percentage of parts (e.g., cells, devices, elements) of the integrated circuit design over a certain frequency (e.g., the frequency, likely frequency, or other desired frequency). The design management component 102 and/or the designer can consider and evaluate all or a desired portion of the area (e.g., area 414) under the curve (e.g., curve 410) when determining or identifying the percentage of parts of the integrated circuit design over a certain frequency.

Further, the design management component 102 and/or the designer can use information relating to the curve (e.g., curve 410) itself of the probability density function in the plot (e.g., plot 400) to facilitate matching the silicon tested frequency associated with the integrated circuit design.

In accordance with the process flow 200, at block 216, design optimization can be performed to facilitate improving the design of the integrated circuit, based at least in part on the filtered analytics, timing path distribution, and/or the design probability density function. The design management component 102 can analyze the filtered analytics, the timing path distribution, and/or the probability density function associated with the integrated circuit design to facilitate identifying or determining one or more ways (e.g., one or more design modifications that can be made to the integrated circuit) to improve the design of the integrated circuit (e.g., to achieve a desired (e.g., suitable, acceptable, optimal) target frequency), in accordance with the defined design criteria. The design management component 102 can modify the integrated circuit design (e.g., modify one or more cells, devices, connections between cells or devices, other elements, of the integrated circuit design), based at least in part on the results of the analysis of the filtered analytics, the timing path distribution, and/or the probability density function associated with the integrated circuit design, to generate a modified integrated circuit design 108, which can be improved (e.g., can provide improved performance and/or timing) over the original or previous integrated circuit design.

For instance, the design management component 102 can evaluate (e.g., simultaneously evaluate) all or a desired portion of the timing paths of the integrated circuit to facilitate determining whether and/or what modifications are to be made to the integrated circuit design. The design management component 102 can determine or identify any or all timing paths of the integrated circuit design that are considered (e.g., by the design management component 102) critical and/or worst performing, or could become critical and/or worst performing (e.g., potentially can become critical and/or worst performing), based at least in part on the results of the analysis of the filtered analytics, the timing path distribution, and/or the probability density function associated with the integrated circuit design, in accordance with the defined design criteria. For example, the design management component 102 can identify one or more timing paths of the timing path distribution (e.g., the timing path distribution in timing path distribution plot 300) that are determined (e.g., by the design management component 102) to be outlier timing paths relative to other timing paths in the timing path distribution, wherein the outlier timing paths can be located in an area(s) (e.g., the area(s) in the portion(s) 318) of the timing path distribution (e.g., the timing path distribution of the plot 300) that has a relatively lower concentration of timing paths than another area(s) of the timing path distribution (e.g., the portion 314 of the timing path distribution of the plot 300 that can be located in an area of the plot 300 having a high path density of timing paths).

The design management component 102 (and/or the designer) can determine that a timing path (e.g., an outlier timing path and/or other timing path) of the integrated circuit design is a critical timing path if such timing path does not satisfy defined design criteria relating to performance of the integrated circuit design and/or particularly to performance of such timing path. In accordance with various implementations, the defined design criteria can relate to a maximum time value of a timing path of the integrated circuit design that is permissible in order to still satisfy the defined design criteria, a number (e.g., a minimum and/or maximum number) of timing paths (e.g., worst timing paths) of the integrated circuit design to select to be in the set of critical timing paths (e.g., to modify the integrated circuit design in a time-efficient manner while satisfying the defined design criteria), a target frequency value for the integrated circuit design, and/or other factors relating to performance of the integrated circuit design or a particular timing path.

For instance, in one example scenario, the design management component 102 can determine that a timing path having the worst mean value (and/or a timing path having the worst mean plus N*sigma value) and one or more other timing paths of the integrated circuit design are critical time paths, based at least in part on the results of the analysis of the filtered analytics, the timing path distribution, and/or the probability density function associated with the integrated circuit design, in accordance with the defined design criteria. Alternatively, in another example scenario, based at least in part on the results of the analysis of the filtered analytics, the timing path distribution, and/or the probability density function associated with the integrated circuit design, and in accordance with the defined design criteria, the design management component 102 can determine that certain timing paths of the integrated circuit design are critical timing paths, wherein the certain timing paths comprise timing paths other than the timing path having the worst mean value and/or the timing path having the worst mean plus N*sigma value.

As another example, with regard to design criteria relating to a maximum time value (e.g., mean value, mean plus N*sigma value) of a timing path of the integrated circuit design that is not to be exceeded in order to satisfy the defined design criteria, the design management component 102 (and/or the designer) can identify and select the timing paths (or at least a desired portion) of the integrated circuit design that have time values that exceed the maximum time value specified by such design criteria, and thus, do not satisfy such design criteria. These one or more timing paths, which can be considered critical timing paths, can be selected by the design management component 102 (and/or the designer) to facilitate determining one or more modifications that can be made to the integrated circuit design (e.g., one or more modifications that can be made to one or more elements of the integrated circuit design), based at least in part on information or characteristics relating to the one or more timing paths, to improve performance of the integrated circuit design.

As still another example, design criteria can relate to timing paths of an integrated circuit design having relatively worse time values (e.g., mean value, mean plus N*sigma value) relative to other time values of other timing paths of the integrated circuit design. The design management component 102 (and/or the designer) can identify and select a subset of the timing paths of the integrated circuit design that have the relatively worse time values than the other time values of the other timing paths of the integrated circuit design, and thus, do not satisfy such design criteria. The design management component 102 can select the subset of the timing paths, which can be considered critical timing paths, to facilitate determining one or more modifications that can be made to the integrated circuit design (e.g., one or more modifications that can be made to one or more elements associated with the subset of the timing paths of the integrated circuit design, based at least in part on information or characteristics associated with the subset of the timing paths, to enhance performance of the integrated circuit design.

In response to determining timing paths that are critical and/or relatively worse performing timing paths, the design management component 102 can determine one or more modifications that can be made to one or more elements of the integrated circuit (e.g., one or more elements associated with such critical and/or relatively worse performing timing paths) to improve the performance of the integrated circuit design. The design management component 102 can initiate or perform the one or more modifications of the integrated circuit design (e.g., the one or more modifications of the one or more elements associated with such timing paths) to generate the modified integrated circuit design 108, which can satisfy the defined design criteria. For instance, the design management component 102 can modify one or more cells, devices, connections between cells or devices, and/or other elements of the integrated circuit design, based at least in part on the one or more modifications, to generate the modified integrated circuit design 108, which can be improved (e.g., can provide improved performance and timing) over the original or previous integrated circuit design and can satisfy the defined design criteria.

As a non-limiting example, with regard to a timing path (e.g., a critical or worse performing timing path) in the subset of timing paths, based at least in part on the results of the analysis, the design management component 102 may determine that modifying one or more cells of the integrated circuit design (e.g., replacing a cell(s) with a different cell(s), adding a cell(s) and associated connections to the integrated circuit design, and/or removing a cell(s) and associated connections from the integrated circuit design) can improve the timing of the timing path and enhance performance of the integrated circuit design, in accordance with the defined design criteria. In response to such determination, the design management component 102 can modify the one or more cells of the integrated circuit design to generate a modified integrated circuit design that can have enhanced performance and timing over the previous integrated circuit design.

It is noted that the critical path frequency derived from other types of design techniques (e.g., corner-based, AOCV, POCV) would remain identical or at least virtually identical. In contrast, in accordance with the disclosed subject matter, the design probability density function determined or generated by the design management component 102 can desirably shift most of the weight of the design density function to a higher frequency. This shifting of most of the weight of the design density function to a higher frequency can result in a higher number or percentage of parts of the integrated circuit design achieving a desired frequency yield (e.g., as compared to a number or percentage of parts of the integrated circuit design achieving a desired frequency yield using other types of design techniques).

Figure 5:
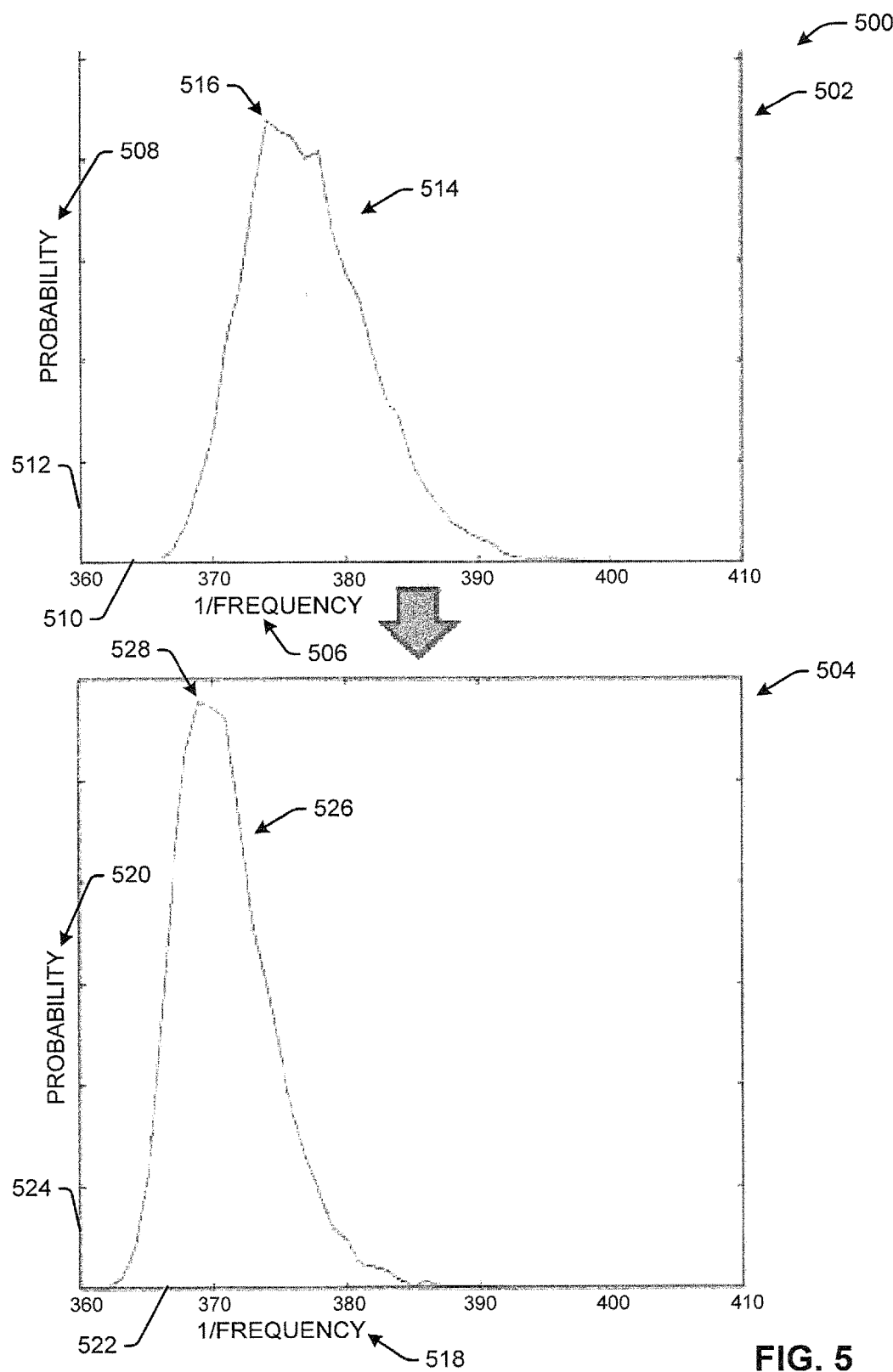
FIG. 5 illustrates diagrams of example non-limiting probability density function plots that can be or represent probability density functions across the parts of an integrated circuit design prior to and after performance of design optimization of the integrated circuit design, in accordance with various aspects and embodiments of the disclosed subject matter.

Referring briefly to FIG. 5 (along with FIGS. 1 and 2), FIG. 5 illustrates diagrams of example non-limiting probability density function plots 500 that can be or represent probability density functions across the parts (e.g., cells, devices, elements) of an integrated circuit design prior to and after performance of design optimization of the integrated circuit design, in accordance with various aspects and embodiments of the disclosed subject matter. The plots 500 can include a first plot 502 that can represent a first probability density function of an integrated circuit prior to optimization or improvement of the integrated circuit design. The plots 500 also can comprise a second plot 504 that can represent a second probability density function of an integrated circuit after optimization or improvement of the integrated circuit design (e.g., by the design management component 102 and/or designer (e.g., using the design management component 102)).

The first plot 502 can be a first probability density function plot of a 1/frequency 506 (e.g., the first period) of a first integrated circuit design (e.g., prior to improvement or optimization) against the probability 508 in which it occurs, wherein the 1/frequency 506 can be plotted along a first axis 510 (e.g., x-axis) of the first plot 502 and the probability 508 can be plotted along a second axis 512 (e.g., y-axis) of the first plot 502. The first plot 502 can comprise a first curve 514 that can represent the first probability density function of the first integrated circuit design, wherein the first curve 514 can be indicative of the accuracy and/or suitability of the first integrated circuit design. The first curve 514 can comprise a first peak 516, which can be related to or indicative of a first frequency associated with the first integrated circuit design.

The second plot 504 can be a second probability density function plot of a 1/frequency 518 (e.g., the second period) of a second integrated circuit design (e.g., after improvement or optimization of the circuit design by the design management component 102 and/or designer) against the probability 520 in which it occurs, wherein the 1/frequency 518 can be plotted along a first axis 522 (e.g., x-axis) of the second plot 504 and the probability 520 can be plotted along a second axis 524 (e.g., y-axis) of the second plot 504. The second plot 504 can comprise a second curve 526 that can represent the second probability density function of the second (e.g., improved) integrated circuit design, wherein the second curve 526 can be indicative of the accuracy and/or suitability of the second integrated circuit design. The second curve 526 can comprise a second peak 528, which can be related to or indicative of a second frequency associated with the second integrated circuit design.

As can be observed from the first plot 502 (an integrated circuit design prior to improvement or optimization) and the second plot 504 (the integrated circuit design after improvement or optimization by the design management component 102 and/or designer), the second plot 504 illustrates an improved integrated circuit design over the integrated circuit design associated with the first plot 502. For instance, the second curve 526 (e.g., as indicated by the second peak 528) is shifted further to the left along the second axis 524 of the second plot 504 than the location of the first curve 514 (e.g., as indicated by the first peak 516) along the second axis 512 of the first plot 502. This can indicate that the second probability density function of the second plot 504 has a higher (and thus more desirable) frequency than frequency of the first probability density function of the first plot 502, which can indicate that the second integrated circuit design associated with the second plot 504 is better than (e.g., improved or optimized over) the first integrated circuit design associated with the first plot 502. Also, the second peak 528 of the second curve 526 of the second plot 504 is higher than the first peak 516 of the first curve 514 of the first plot 502. This also can indicate that the second integrated circuit design associated with the second plot 504 is better than (e.g., improved or optimized over) the first integrated circuit design associated with the first plot 502.

Further, it can be observed from FIG. 5 that the second curve 526 is leaner (e.g., less wide) than the first curve 514 and taller (e.g., due to the second peak 528 being higher than the first peak 516) than the first curve 514. Thus, the distribution of the second plot 504 is narrower, leaner, taller, and improved over the distribution of the first plot 502. This also can indicate that the second integrated circuit design is better than (e.g., improved or optimized over) the first integrated circuit design, as it can indicate that a higher number or percentage of parts (e.g., cells, devices, elements) of the second integrated circuit design associated with the second plot 504 achieve a desired (e.g., suitable, acceptable, optimal) frequency yield than the number or percentage of parts of the first integrated circuit design associated with the first plot 502 that achieve the desired frequency yield.

With further regard to FIGS. 1 and 2, the design management component 102 can store the information relating to the modified integrated circuit design 108 in the design database 104 and/or store the various analysis results (e.g., STA timing analysis results, timing path distribution, filtered analytics, probability density function) relating to the integrated circuit design and/or modified integrated circuit design 108 in the data store 106 and/or the design database 104, as more fully disclosed herein.

In some implementations, the design management component 102 can analyze and evaluate the information relating to the modified integrated circuit design 108 to determine or verify whether the modified integrated circuit design satisfies the defined design criteria (e.g., design criteria relating to performance of an integrated circuit design). For instance, the design management component 102 can perform some or all of the analyses on information relating to the modified integrated circuit design 108. Based at least in part on the results of such analyses, the design management component 102 can determine or verify whether the modified integrated circuit design satisfies the defined design criteria.

In response to the results of such evaluation of the modified integrated circuit design 108 indicating that the modified integrated circuit design 108 (e.g., the improved, suitable, acceptable, and/or optimal modified integrated circuit design) satisfies the defined design criteria, the design management component 102 can determine that the designing of the integrated circuit (e.g., modified integrated circuit) has been completed. Alternatively, in response to the results of such evaluation of the modified integrated circuit design 108 indicating that the modified integrated circuit design 108 still does not satisfy the defined design criteria, the design management component 102 can determine that further modification is to be made to the modified integrated circuit design 108, and the design management component 102 can employ the disclosed techniques and algorithms (e.g., the SFOM) to further analyze the modified integrated circuit design 108 and determine one or more modifications to make to the modified integrated circuit design 108 to further improve it, in accordance with the defined design criteria.

Employing the techniques and aspects of the disclosed subject matter, the system 100 can provide improved design of an integrated circuit that can have an improved (e.g., increased) chance of satisfying (e.g., meeting) target circuit design or performance criteria when implemented in silicon, can be more efficient in achieving the desired design and performance of an integrated circuit (e.g., can utilize less resources and information, and can take less time, to achieve the desired design and performance of the integrated circuit), as compared to other types of systems, methods, and techniques (e.g., corner-based method, OCV method, AOCV method, POCV method) for designing integrated circuits. For instance, when using other types of design techniques (e.g., corner-based, AOCV, POCV), the critical path frequency derived from using such techniques would remain identical or at least virtually identical. In contrast, in accordance with the disclosed subject matter, before an integrated circuit design is implemented in silicon, the design management component 102 can analyze the integrated circuit design, including analyzing (e.g., simultaneously analyzing) all of the timing paths of the design, identify any and all timing paths that can be considered critical, determine modifications to make to the integrated circuit design to address all of the issues with the critical timing paths, and implement such modifications to generate a modified integrated circuit design 108 that satisfies the defined design criteria. This can result in a meaningful and beneficial change (e.g., improvement) to the circuit design, which can be reflected in the design probability density function for the modified integrated circuit design 108. The design probability density function determined or generated by the design management component 102 (e.g., for the modified integrated circuit design 108) can desirably shift most of the weight of the design probability density function to a higher frequency. This shifting of most of the weight of the design probability density function to a higher frequency can result in a higher number or percentage of parts of the integrated circuit design achieving a desired frequency yield, for example, as compared to a number or percentage of parts of the integrated circuit design achieving a desired frequency yield using the other types of design techniques.

Figure 6:
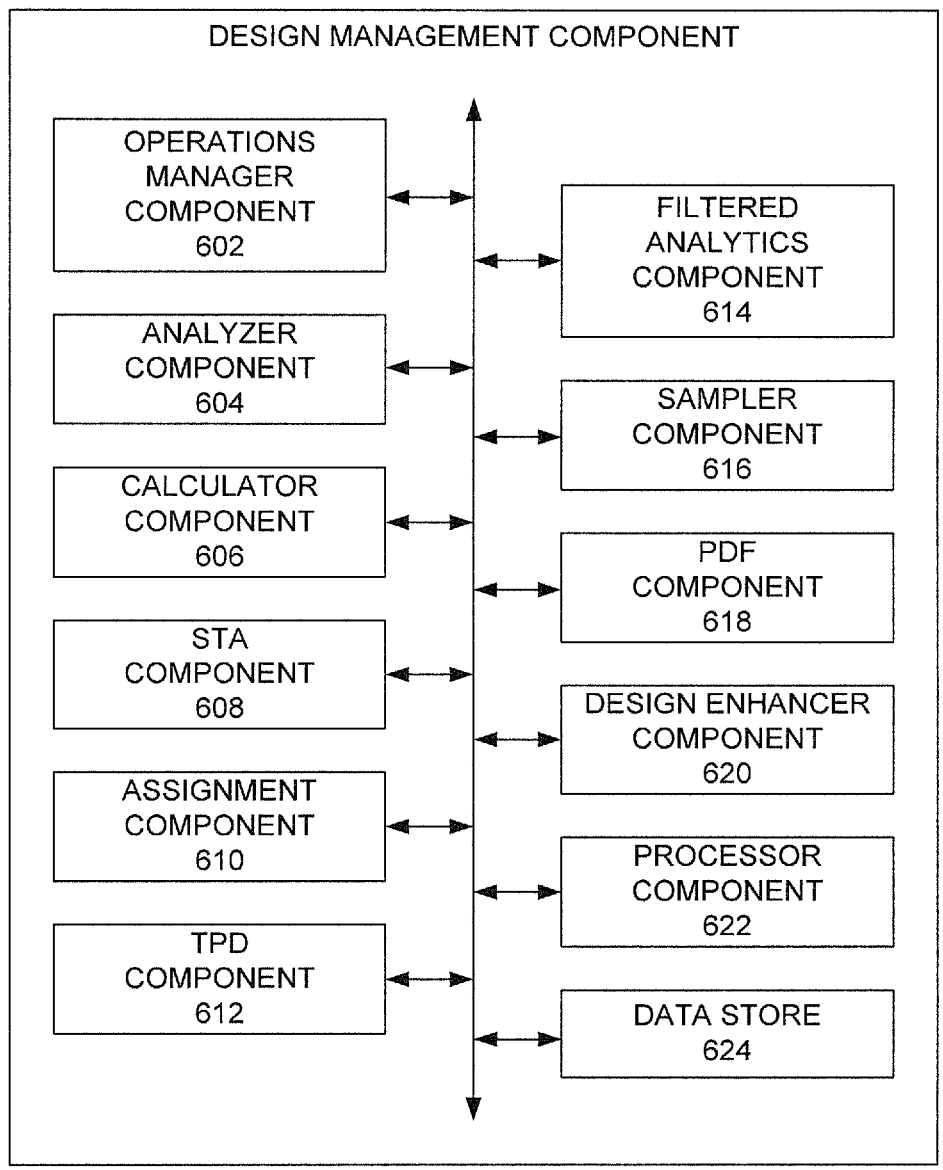
FIG. 6 illustrates a block diagram of an example, non-limiting embodiment of a design management component, in accordance with various aspects and embodiments of the disclosed subject matter.

FIG. 6 illustrates a block diagram of an example, non-limiting embodiment of a design management component 600, in accordance with various aspects and embodiments of the disclosed subject matter. The design management component 600 can comprise, for example, an operations manager component 602, an analyzer component 604, a calculator component 606, an STA component 608, an assignment component 610, a timing path distribution (TPD) component 612, a filtered analytics component 614, a sampler component 616, a probability density function (PDF) component 618, a design enhancer component 620, and a processor component 622, and a data store 624.

The operations manager component 602 can control or manage operations and/or algorithms being performed by various components of the design management component 600, controlling data flow between various components of the design management component 600, controlling data flow between the design management component 600 and other components or devices (e.g., design database, communication network component) associated with (e.g., connected to) the design management component 600, etc.

The analyzer component 604 can perform analysis on data and/or elements (e.g., information associated with cells, devices, or other elements) associated with the integrated circuit design, and can generate analysis results based at least in part on the analysis. For instance, the analyzer component 604 can analyze information relating to the elements of an integrated circuit design to facilitate characterizing the elements or identifying attributes (e.g., cell height, channel width, VT doping, stack height) relating to the elements (e.g., cells). The analyzer component 604 also can operate in conjunction with the STA component 608 to facilitate performing an STA analysis on information associated with (e.g., detailing) an integrated circuit design). The analyzer component 604 further can operate in conjunction with the filtered analytics component 614 to facilitate generating filtered analytics relating to an integrated circuit design. The analyzer component 604 also can perform other data analysis and/or cell analysis, such as more fully disclosed herein.

The calculator component 606 can be employed to perform various calculations on data in connection with the analyzing of data or simulation of the cells. For example, with regard to each or desired timing paths of an integrated circuit design, the calculator component 606 can be employed to calculate a mean value, a mean plus N*sigma value, or other type of value(s) (e.g., timing value, sampled value) for a timing path. The calculator component 606 also can be used to perform other calculations, such as, for example, calculations relating to generating a timing path distribution, generating filtered analytics, and/or generating a design probability density function relating to an integrated circuit design.

The STA component 608 can be employed to perform a timing analysis (e.g., a static timing analysis) on an integrated circuit design and generate results relating to timing issues associated with the integrated circuit design. The STA analysis performed by the STA component 608 can generate, capture, and facilitate analysis of all critical timing associated with timing paths of the integrated circuit design, instead of performing analysis of only a worst mean value of the integrated circuit design or a worst mean plus N*sigma value of the integrated circuit design.

The results of the STA analysis can facilitate determining which timing paths of an integrated circuit design are to be considered critical timing paths. The STA analysis can take into account respective slack values, respective required time values relating to signal arrival, respective clock or timing skew, etc., associated with elements or associated timing paths of the integrated circuit design. The STA analysis performed by the STA component 608 can identify, for example, cell or device characteristics (e.g., cell or device attributes), timing delays (e.g., cell delay, net or interconnect delay, timing path delay), setup time and hold time violations, slew characteristics, clock or timing skews (e.g., skew characteristics), maximum clock frequency, etc., associated with the integrated circuit design, or portions thereof (e.g., cells, devices, interconnections between cells and/or devices, or other elements of the integrated circuit design).

The assignment component 610 can assign correlated timing paths of an integrated circuit design as independent variables, in accordance with the defined design criteria, for example, to facilitate seeding analysis of the integrated circuit design to produce a timing path distribution and filtered analytics relating to the integrated circuit design. The assignment component 610 can assign the correlated timing paths as independent variables based at least in part on the size of the design database associated with the integrated circuit design, the effective runtime for the analysis of the integrated circuit design, and the level or degree of accuracy desired in the analysis results of the analysis of the integrated circuit design. The assigning of correlated timing paths of an integrated circuit design as independent variables by the assignment component 610 can vary, for example, from taking divergent points from a clock distribution of the integrated circuit design and marking each timing path as independent to assigning each gate in the integrated circuit design as being independent.

The TPD component 612 can be employed to generate a timing path distribution of the timing paths associated with an integrated circuit design. The timing path distribution associated with the integrated circuit design that is generated by the TPD component 612 can be based at least in part on the results of the STA analysis and/or the assignment of correlated timing paths of the integrated circuit design as independent variables. The timing path distribution can abbreviate or abstract information relating to the timing paths of the integrated circuit design to represent each timing path by the mean, sigma, and the population and/or density of each independent variable associated with the timing path.

The filtered analytics component 614 can determine and generate filtered analytics of the independent variables with regard to an integrated circuit design. The filtered analytics associated with the integrated circuit design that are generated by the filtered analytics component 614 can be based at least in part on the results of the STA analysis and/or the assignment of correlated timing paths of the integrated circuit design as independent variables. The filtered analytics component 614 can employ techniques or methods to facilitate associating (e.g., linking) the respective independent variables back to the respective timing paths associated with the integrated circuit design. The filtered analytics component 614 can determine and generate the filtered analytics based at least in part of one or more various factors comprising, for example, the qualifiers for variable assignment, the frequency or variation weighed instance mapping, and/or cell types (e.g., VT, channel length, drive strength, . . . ) associated with the integrated circuit design, or portion thereof.

The sampler component 616 can generate a sampled value (e.g., a random sampled value) of each timing path of an integrated circuit design. The sampler component 616 can generate respective random numbers (e.g., using a random or pseudo-random number generator). The sampler component 616 can apply the respective random numbers to respective timing paths of the integrated circuit design, wherein the respective timing paths can receive the respective random numbers. The sampler component 616 can generate respective sampled values (e.g., random sampled values) associated with the respective timing paths based at least in part on the respective timing values received by the respective timing paths. The sampler component 616 can perform the sampling of timing paths over a statistically significant number of parts (e.g., cells, devices, or other elements) of the integrated circuit design to sufficiently guarantee a desirably accurate reflection of a design probability density function associated with the integrated circuit design.

The PDF component 618 can generate a design probability density function relating to an integrated circuit design based at least in part on the results of the STA analysis, the timing path distribution, and/or the results (e.g., sampled values) of the sampling (e.g., random sampling) associated with the timing paths by the sampler component 616. The design probability density function, the timing path distribution, and/or the filtered analytics associated with the integrated circuit design can be used to facilitate determining modifications that can be made to the integrated circuit design to facilitate enhancing the performance of the integrated circuit design, in accordance with the defined design criteria. The PDF component 618 can generate a plot of the period, or 1/frequency, of the integrated circuit design against the probability in which the period occurs with respect to the integrated circuit design. Features (e.g., the curve, the peak of the curve, the area under the curve, . . . ) of a design probability density function associated with an integrated circuit design can be used by the design management component 600 (e.g., the design enhancer component 620 of the design management component 600) to facilitate determining modifications that can be made to the integrated circuit design to improve the performance of the integrated circuit design, as more fully disclosed herein.

The design enhancer component 620 can be employed to determine modifications that can be made to an integrated circuit design to generate a modified and improved integrated circuit design based at least in part on the timing path distribution, the filtered analytics, and/or the design probability density function associated with an integrated circuit design, in accordance with the defined design criteria. The design probability density function can facilitate shifting most its weight to a higher frequency, which can result in a higher number of parts (e.g., cells, devices, or other elements) of the integrated circuit design achieving a desired frequency yield. Depending in part on the type and desired functions of the integrated circuit, the design enhancer component 620 can modify the layout of the integrated circuit, modify or replace cells or devices in the integrated circuit, modify connections between cells and/or devices of the integrated circuit, etc., based at least in part on the results of analyzing the information presented in the timing path distribution, the filtered analytics, and/or the design probability density function associated with the integrated circuit design, to modify and improve the integrated circuit design to satisfy the defined design criteria.

The processor component 622 can operate in conjunction with the other components (e.g., operations manager component 602, analyzer component 604, calculator component 606, STA component 608, and other components disclosed herein) to facilitate performing the various functions of the design management component 600, such as disclosed herein. The processor component 622 can employ one or more processors (e.g., central processing units (CPUs), graphical processing units (GPUs), field-programmable gate arrays (FPGAs)), microprocessors, or controllers that can process data, such as information (e.g., data, analog or digital information) relating to operations performed by the design management component 600, etc., to facilitate analyzing data relating to an integrated circuit design (e.g., data obtained from the design database), generating STA data, assigning correlated timing paths of the integrated circuit design as independent variables, generating a timing path distribution associated with the integrated circuit design, generating sampled values of timing paths of the integrated circuit design, generating filtered analytics associated with the integrated circuit design, generating a design probability density function associated with the integrated circuit design, performing calculations on data, enhancing the integrated circuit design, and/or performing other operations; can control data flow between the design management component 600 and other components (e.g., data store comprising the design database, communication network component) associated with (e.g., connected to) the design management component 600; and can control data flow between the various components of the design management component 600.

In yet another aspect, the data store 624 can store data structures (e.g., voice information, data, metadata); code structure(s) (e.g., modules, objects, classes, procedures), commands, or instructions; information relating to analyzing data relating to the integrated circuit design (e.g., data obtained from the design database), generating STA data, assigning correlated timing paths of the integrated circuit design as independent variables, generating a timing path distribution associated with the integrated circuit design, generating sampled values of timing paths of the integrated circuit design, generating filtered analytics associated with the integrated circuit design, generating a design probability density function associated with the integrated circuit design, performing calculations on data, enhancing the integrated circuit design, and/or performing other operations; parameter data; information relating to algorithms (e.g., an SFO algorithm for analyzing and enhancing the integrated circuit design, an STA algorithm for performing an STA of the integrated circuit design, a timing path distribution algorithm for generating the timing path distribution of an integrated circuit design, a filtered analytics algorithm for generating the filtered analytics relating to an integrated circuit design, a design probability density function algorithm for generating the design probability density function relating to an integrated circuit design, . . . ); and so on. In an aspect, the processor component 622 can be functionally coupled (e.g., through a memory bus) to the data store 624 in order to store and retrieve information desired to operate and/or confer functionality, at least in part, to the operations manager component 602, analyzer component 604, calculator component 606, STA component 608, and other components disclosed herein, and/or substantially any other operational aspects of the design management component 600.

It is to be appreciated and understood that the various components of the design management component 600 can communicate information between each other and/or between other components associated with the design management component 600 as desired to carry out operations of the design management component 600. It is to be further appreciated and understood that respective components (e.g., operations manager component 602, analyzer component 604, calculator component 606, STA component 608, and other components disclosed herein) of the design management component 600 each can be a stand-alone unit, can be included within the design management component 600 (as depicted), can be incorporated within another component of the design management component 600, or can be a component separate from the design management component 600, and/or virtually any suitable combination thereof, as desired.

Figure 7:
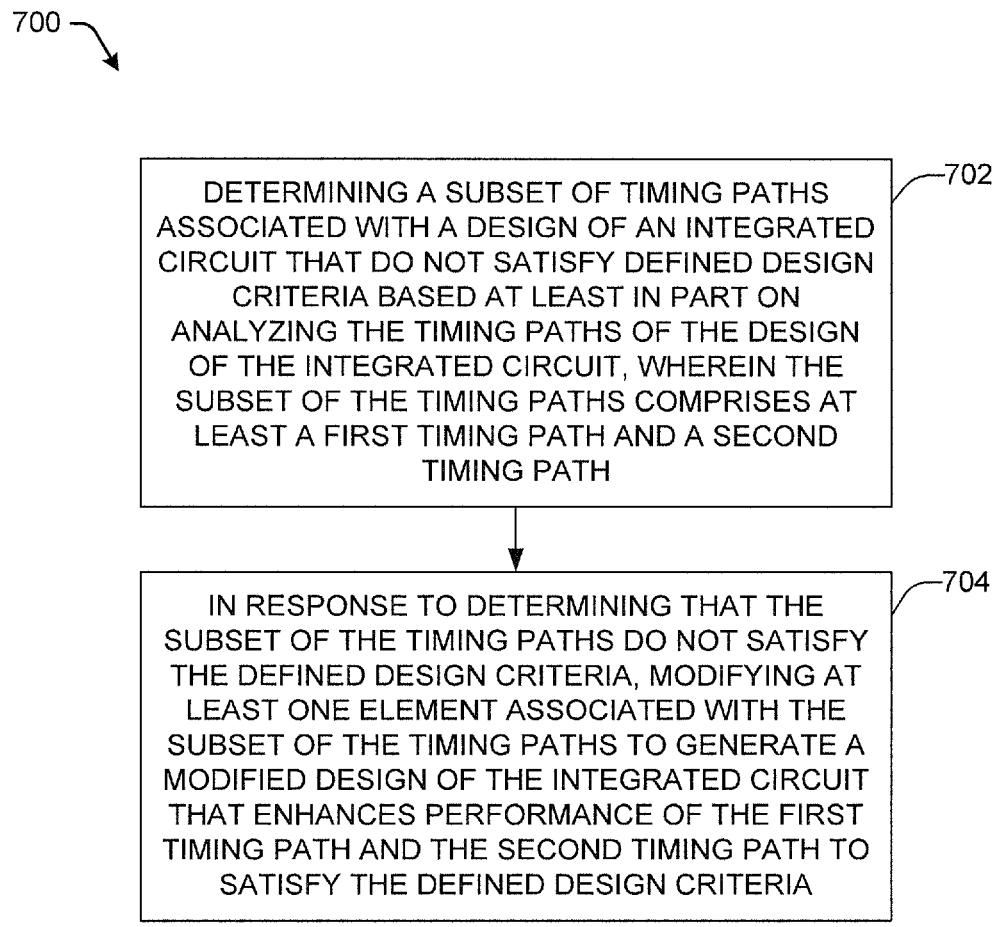
FIG. 7 depicts a flow diagram of an example method that can efficiently enhance an integrated circuit design, in accordance with various aspects and embodiments of the disclosed subject matter.
Figure 8:
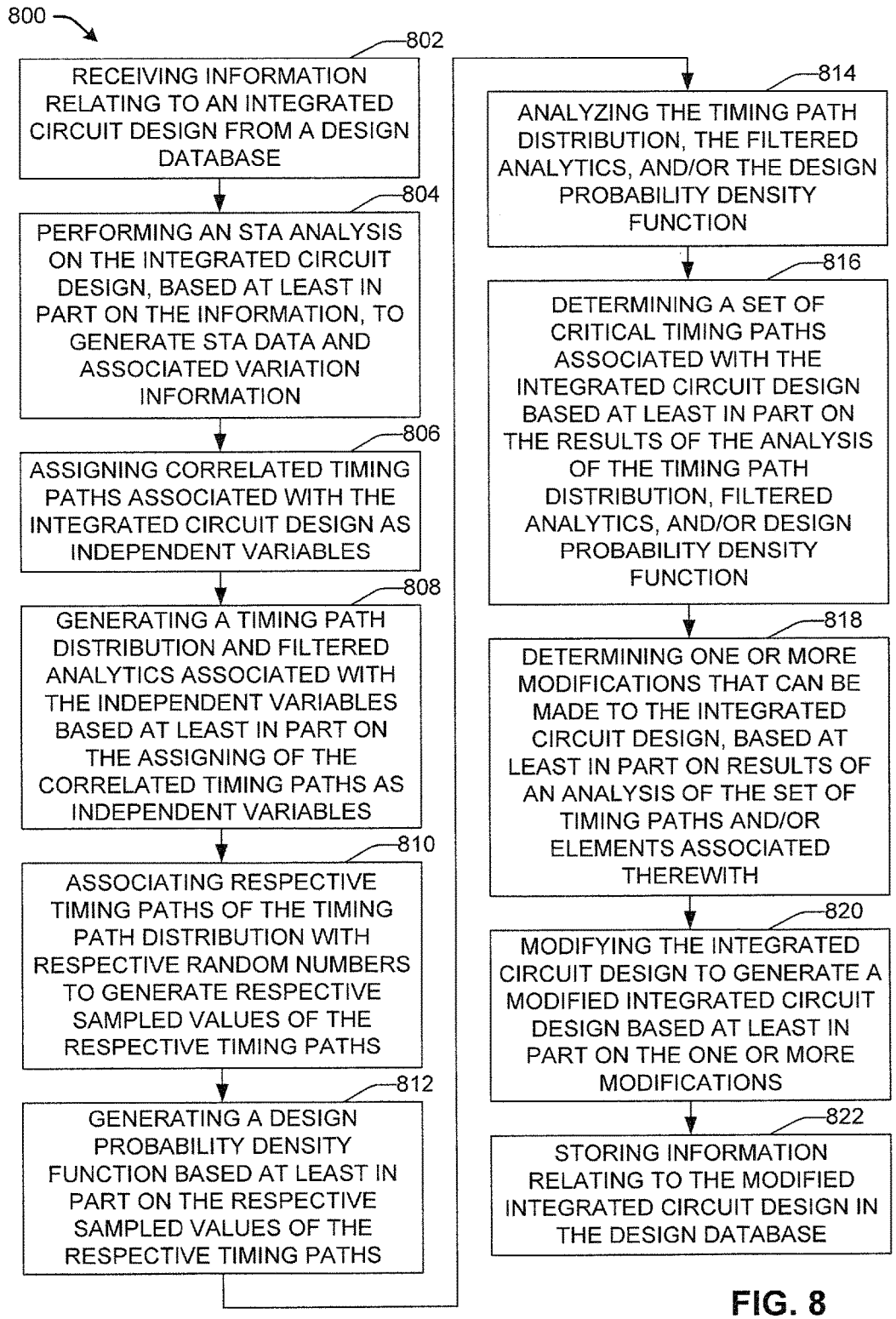
FIG. 8 illustrates a flow diagram of another example method that can efficiently enhance an integrated circuit design, in accordance with various aspects and embodiments of the disclosed subject matter.

In view of the example systems described above, methods that may be implemented in accordance with the described subject matter may be better appreciated with reference to the flow charts of FIGS. 7-8. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 depicts a flow diagram of an example method 700 that can efficiently enhance an integrated circuit design, in accordance with various aspects and embodiments of the disclosed subject matter. The method 700 can be implemented by a design management component, for example.

At block 702, a subset of timing paths associated with a design of an integrated circuit that do not satisfy the defined design criteria can be determined based at least in part on analyzing the timing paths of the design of the integrated circuit, wherein the subset of the timing paths comprises at least a first timing path and a second timing path. The design management component can access information relating to an integrated circuit design from a design database. The information relating to the integrated circuit design can comprise information relating to elements (e.g., cells, devices, connections or paths associated with cells or devices, other elements) and/or characteristics (e.g., characteristics of or associated with cells or devices) associated with the integrated circuit design.

The design management component can analyze the information relating to the integrated circuit design and/or information derived from such information (e.g., intermediate analysis results), and can generate analysis results based at least in part on the analysis, wherein the analysis can comprise various types of analyses (e.g., an STA timing analysis associated with the integrated circuit design; an analysis or analyses to generate a timing path distribution, filtered analytics, and/or a probability density function, associated with the integrated circuit design). The design management component can determine that the subset of the timing paths, comprising the first and second timing paths, do not satisfy the defined design criteria based at least in part on the results of analyzing the timing paths of the integrated circuits design. The defined design criteria can relate to, for example, performance of the integrated circuit.

At block 704, in response to determining that the subset of the timing paths do not satisfy the defined design criteria, at least one element associated with the subset of the timing paths can be modified to generate a modified design of the integrated circuit that enhances performance of the first timing path and the second timing path to satisfy the defined design criteria. In response to determining that the subset of the timing paths do not satisfy the defined design criteria, the design management component can modify at least one element associated with the subset of the timing paths to generate a modified design of the integrated circuit. The modified design of the integrated circuit can enhance performance of the first timing path and the second timing path in order to satisfy the defined design criteria.

FIG. 8 illustrates a flow diagram of another example method 800 that can efficiently enhance an integrated circuit design, in accordance with various aspects and embodiments of the disclosed subject matter. The method 800 can be implemented by a design management component, for example.

At block 802, information relating to an integrated circuit design can be received from a design database. The design management component can access the design database, which can comprise information relating to the integrated circuit design. The design management component can retrieve the information relating to the integrated circuit design from the design database.

At block 804, an STA analysis can be performed on the integrated circuit design, based at least in part on the information relating to the integrated circuit design, to generate STA data and associated variation information. The design management component can perform the STA analysis on the integrated circuit design using the information relating to the integrated circuit design. Based at least in part on the results of the STA analysis, the design management component can generate STA data and associated variation information that can be associated with the integrated circuit design. The STA data can comprise timing information relating to the timing or expected timing of respective timing paths associated with respective elements of the integrated circuit design. The analysis results also can comprise associated variation information, such as, for example, information relating to respective process variations associated with respective cells of an integrated circuit design (e.g., variations in characteristics of the respective cells, the variations in how the respective cells react under certain conditions).

At block 806, correlated timing paths associated with the integrated circuit design can be assigned as independent variables. The design management component can assign the correlated timing paths as independent variables to facilitate seeding the analysis of the integrated circuit design. The assigning of the correlated timing paths as independent variables can depend in part on a number of factors, including the size of the design database, the effective or estimated runtime of analysis of the integrated circuit design, and the level of accuracy desired for the results of the analysis of the integrated circuit design, in accordance with the defined design criteria.

At block 808, a timing path distribution and filtered analytics associated with the independent variables can be generated based at least in part on the assigning of the correlated timing paths associated with the integrated circuit design as independent variables. The design management component can generate the timing path distribution and the filtered analytics associated with the independent variables based at least in part on the assigning of the correlated timing paths associated with the integrated circuit design as independent variables, wherein the timing path distribution and the filtered analytics are associated with the integrated circuit design.

At block 810, respective timing paths of the timing path distribution can be associated with respective random numbers to generate respective sampled values of the respective timing paths. The design management component can associate (e.g., link, assign) the respective timing paths of the timing path distribution with the respective random numbers, wherein the timing path distribution can be associated with the respective timing paths of the integrated circuit design. The design management component can generate the respective sampled values of the respective timing paths based at least in part on the respective random numbers associated with the respective timing paths. The design management component can repeat this sampling method over a statistically significant number of parts to sufficiently guarantee (e.g., guarantee to a defined confidence level, such as, for example, a 90% or 95% confidence level) an accurate reflection of the design probability density function, in accordance with the defined design criteria.

The timing paths can all be part of the same clock domain, with the maximum period being used to set the maximum frequency. Therefore, the design management component can use the maximum sampled value of the timing paths in the timing path distribution to define the frequency of a single part (e.g., cell, device, or other element) of the integrated circuit design.

At block 812, a design probability density function can be generated based at least in part on the respective sampled values of the respective timing paths associated with the integrated circuit design. The design management component can generate the design probability density function based at least in part on the respective sampled values of the respective timing paths associated with the integrated circuit design. For instance, the design management component can plot the period, which can be 1/frequency, of the integrated circuit design, against the probability in which the period occurs, which can be the design probability density function of the integrated circuit design.

The design management component and/or the designer can directly use the plot of the design probability density function to correlate against the silicon to be used to fabricate the integrated circuit design in a number of desirable ways. For example, the design management component or designer can utilize the plot of the design probability density function to identify the frequency or likely (e.g., most likely) frequency associated with the integrated circuit design based at least in part on the peak (e.g., peak, or highest peak of all of the peaks (when there are multiple peaks)) of the design probability density function. The design management component or designer can analyze the design probability density function and, based on such analysis, can identify or determine the peak (or highest peak of multiple peaks). The design management component or designer can determine that the peak (or highest peak of multiple peaks) is the frequency or likely frequency associated with the integrated circuit design.

As another example, based in part on the results of the analysis of the design probability density function, the design management component and/or the designer can determine (e.g., calculate) the area under the curve of the design probability density function. The design management component and/or the designer can utilize the area under the curve to identify the percentage of parts (e.g., cells, devices, or other elements) of the integrated circuit design over a certain frequency. As still another example, the design management component and/or the designer can use the curve of the design probability density function to match the silicon tested frequency associated with the silicon.

At block 814, the timing path distribution, the filtered analytics, and/or the design probability density function associated with the integrated circuit design can be analyzed. The design management component and/or designer can analyze the timing path distribution, the filtered analytics, and/or the design probability density function associated with the integrated circuit design to facilitate determining modifications that can be made to the integrated circuit design to improve the integrated circuit design.

At block 816, a set of critical timing paths (e.g., most critical paths) associated with the integrated circuit design can be determined based at least in part on the results of the analysis of the timing path distribution, the filtered analytics, and/or the design probability density function. The design management component and/or the designer can determine or identify the set of critical timing paths associated with the integrated circuit design based at least in part on the results of the analysis of the timing path distribution, the filtered analytics, and/or the design probability density function. The design management component or designer can analyze and evaluate all of the timing paths of the integrated circuit design at the same time to facilitate determining a set of timing paths of the integrated circuit design that can be determined to be critical or worst performing timing paths relative to the other timing paths of the integrated circuit design.

The design management component and/or the designer can determine that a timing path of the integrated circuit design is a critical timing path if such timing path does not meet (e.g., does not satisfy) defined design criteria relating to performance of the integrated circuit design. For instance, the defined design criteria can relate to a maximum time value of a timing path of the integrated circuit design to satisfy the defined design criteria, a number (e.g., a minimum and/or maximum number) of timing paths (e.g., worst timing paths) of the integrated circuit design to select to be in the set of critical timing paths, or a target frequency value for the integrated circuit design.

For example, with regard to design criteria relating to a maximum time value (e.g., mean value, mean plus N*sigma value) of a timing path of the integrated circuit design to satisfy the defined design criteria, the design management component or designer can identify and select all (e.g., one or more) timing paths of the integrated circuit design that have time values that exceed the maximum time value specified by such design criteria, and thus, do not satisfy such design criteria. These one or more timing paths, which can be considered critical timing paths, can be selected by the design management component or designer to facilitate determining modifications that can be made to the integrated circuit design to improve performance of the integrated circuit design.

As another example, the defined design criteria can specify that a certain number (e.g., 10, 20, or other desired number) of the worst tinning paths associated with the integrated circuit design can be selected by the design management component or designer to facilitate determining modifications that can be made to the integrated circuit design to improve performance of the integrated circuit design. The worst timing paths can be those timing paths that can have the worst mean values or worst mean plus N*sigma values relative to (e.g., as compared to) the mean values or mean plus N*sigma values of the other timing paths associated with the integrated circuit design.

At block 818, one or more modifications that can be made to the integrated circuit design can be determined, based at least in part on results of an analysis of the set of timing paths (e.g., critical timing paths) and/or elements (e.g., cells, devices, and/or connections between cells or devices) associated with the set of timing paths, to facilitate improving the performance of the integrated circuit. The design management component or designer can analyze the set of timing paths and associated elements. Based at least in part on the results of such analysis, the design management component or designer one or more modifications that can be made to the integrated circuit design to facilitate improving the performance of the integrated circuit.

At block 820, the integrated circuit design can be modified to generate a modified integrated circuit design based at least in part on the one or more modification. The design management component can modify the integrated circuit design to generate the modified (and improved) integrated circuit design based at least in part on the one or more modifications to improve the performance of the integrated circuit, in accordance with the defined design criteria.

At block 822, information relating to the modified integrated circuit design can be stored in the design database. The design management component can store the information relating to the modified integrated circuit design in the design database. Such information can detail the modified integrated circuit, including the elements employed in the modified design, the relationships between the respective elements (e.g., respective connections between respective cells or devices), and/or the modified circuit layout, etc.

In some implementations, further analysis can be performed (e.g., by the design management component or designer) on the modified integrated circuit design to facilitate determining or verifying whether the modified integrated circuit design is acceptable (e.g., satisfies the defined design criteria). In such implementations, the method 800 can proceed back to block 802 and all or a desired portion of the method 800 can be performed with regard to the modified integrated circuit design to facilitate verifying that the modified integrated circuit design is acceptable or determining one or more additional modifications to be made to the modified integrated circuit design to further improve the integrated circuit and satisfy the defined design criteria.

Example Computing Environment

Figure 9:
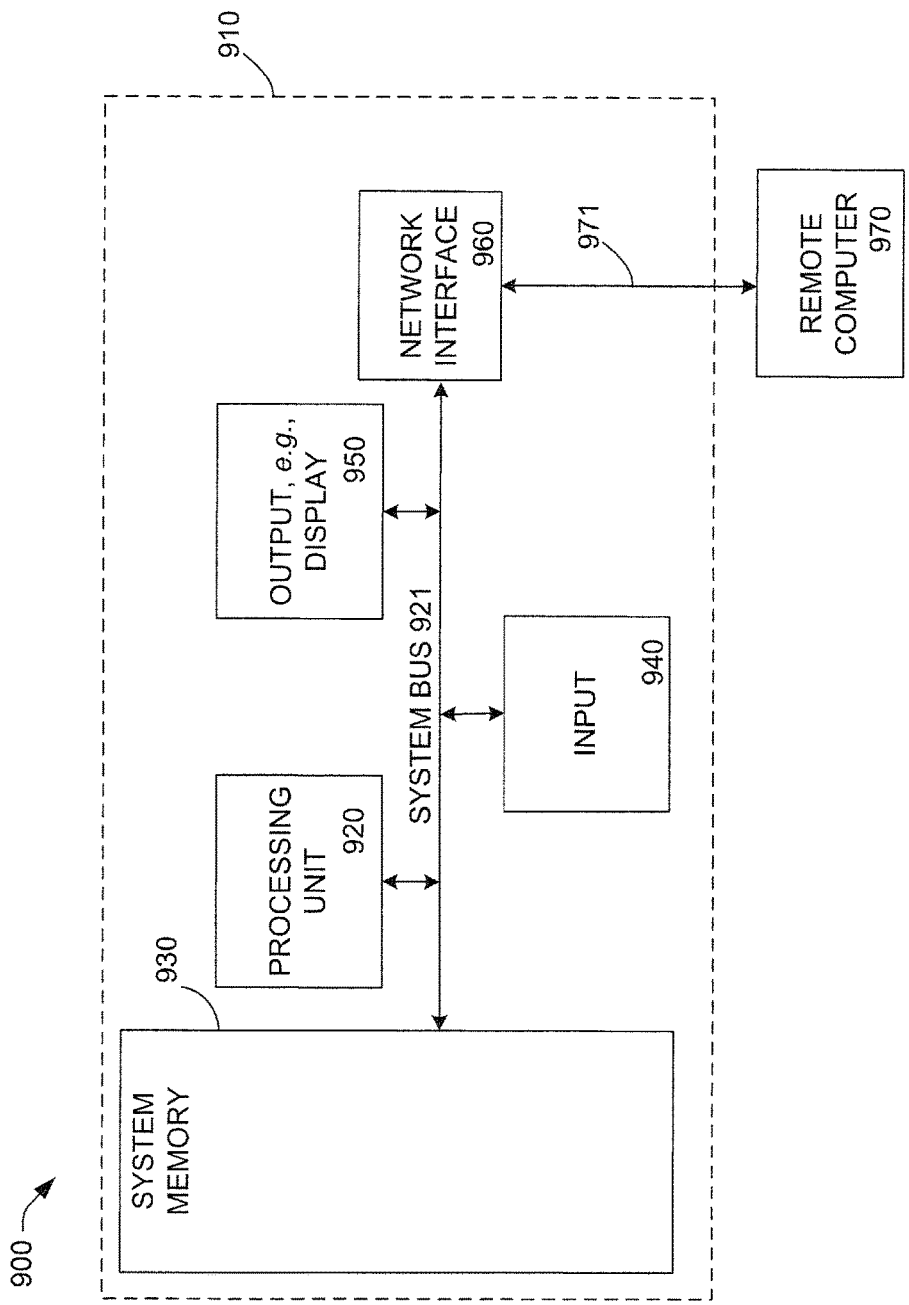
FIG. 9 illustrates a block diagram of an example electronic computing environment that can be implemented in conjunction with one or more aspects described herein.

As mentioned, advantageously, the techniques described herein can be applied to any device and/or network where analysis of data, performing an STA on an integrated circuit design, generating a timing path distribution associated with the integrated circuit design, generating filtered analytics associated with the integrated circuit design, generating a design probability density function associated with the integrated circuit design, and/or enhancement of performance and/or modification of an element (e.g., cell, device, circuit connections, . . . ) of the integrated circuit design can be desirable in a system comprising a device(s) or component(s) (e.g., design management component, design database, STA component, timing path distribution component, filtered analytics component, probability density function component, design enhancer component, data store, . . . ). It is to be understood, therefore, that handheld, portable and other computing devices and computing objects of all kinds are contemplated for use in connection with the various non-limiting embodiments, e.g., anywhere that it can be desirable for a device to be employed to facilitate generation of a design management component, design database, STA component, timing path distribution component, filtered analytics component, probability density function component, design enhancer component, data store, etc., for use, respectively, in the analysis of data, performing an STA on an integrated circuit design, generating a timing path distribution associated with the integrated circuit design, generating filtered analytics associated with the integrated circuit design, generating a design probability density function associated with the integrated circuit design, and/or enhancement of performance and/or modification of an element (e.g., cell, device, circuit connections, . . . ) of the integrated circuit design, or to be employed to comprise or be associated with a design management component, design database, STA component, timing path distribution component, filtered analytics component, probability density function component, design enhancer component, data store, etc., to facilitate communication of data in connection with the analysis of data, performing an STA on an integrated circuit design, generating a timing path distribution associated with the integrated circuit design, generating filtered analytics associated with the integrated circuit design, generating a design probability density function associated with the integrated circuit design, and/or enhancement of performance and/or modification of an element (e.g., cell, device, circuit connections, . . . ) of an integrated circuit design. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 9 thus illustrates an example of a suitable computing system environment 900 in which some aspects of the disclosed subject matter can be implemented, although as made clear above, the computing system environment 900 is only one example of a suitable computing environment for a device and is not intended to suggest any limitation as to the scope of use or functionality of the disclosed subject matter. Neither should the computing environment 900 be interpreted as having any dependency or requirement relating to any one or combination of components illustrated in the exemplary operating environment 900.

With reference to FIG. 9, an exemplary device for implementing the disclosed subject matter includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures.

Computer 910 typically includes a variety of computer readable media. Computer readable media can be any available media that can be accessed by computer 910. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules, or other data in a modulated data signal such as a carrier wave or other transport mechanism and includes any information delivery media.

The system memory 930 may include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, may be stored in memory 930. Memory 930 typically also contains data and/or program modules that are immediately accessible to and/or presently being operated on by processing unit 920. By way of example, and not limitation, memory 930 may also include an operating system, application programs, other program modules, and program data.

The computer 910 may also include other removable/non-removable, volatile/nonvolatile computer storage media. For example, computer 910 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 921 through a non-removable memory interface such as an interface, and a magnetic disk drive or optical disk drive is typically connected to the system bus 921 by a removable memory interface, such as an interface.

A user can enter commands and information into the computer 910 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 920 through user input 940 and associated interface(s) that are coupled to the system bus 921, but may be connected by other interface and bus structures, such as a parallel port, game port, or a universal serial bus (USB). A graphics subsystem can also be connected to the system bus 921. A projection unit in a projection display device, or a HUD in a viewing device or other type of display device can also be connected to the system bus 921 via an interface, such as output interface 950, which may in turn communicate with video memory. In addition to a monitor, computers can also include other peripheral output devices such as speakers which can be connected through output interface 950.

The computer 910 can operate in a networked or distributed environment using logical connections to one or more other remote computer(s), such as remote computer 970, which can in turn have media capabilities different from device 910. The remote computer 970 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 910. The logical connections depicted in FIG. 9 include a network 971, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 910 can be connected to the LAN 971 through a network interface or adapter. When used in a WAN networking environment, the computer 910 can typically include a communications component, such as a modem, or other means for establishing communications over the WAN, such as the Internet. A communications component, such as wireless communications component, a modem and so on, which can be internal or external, can be connected to the system bus 921 via the user input interface of input 940, or other appropriate mechanism. In a networked environment, program modules depicted relative to the computer 910, or portions thereof, can be stored in a remote memory storage device. It will be appreciated that the network connections shown and described are exemplary and other means of establishing a communications link between the computers can be used.

Example Networking Environment

Figure 10:
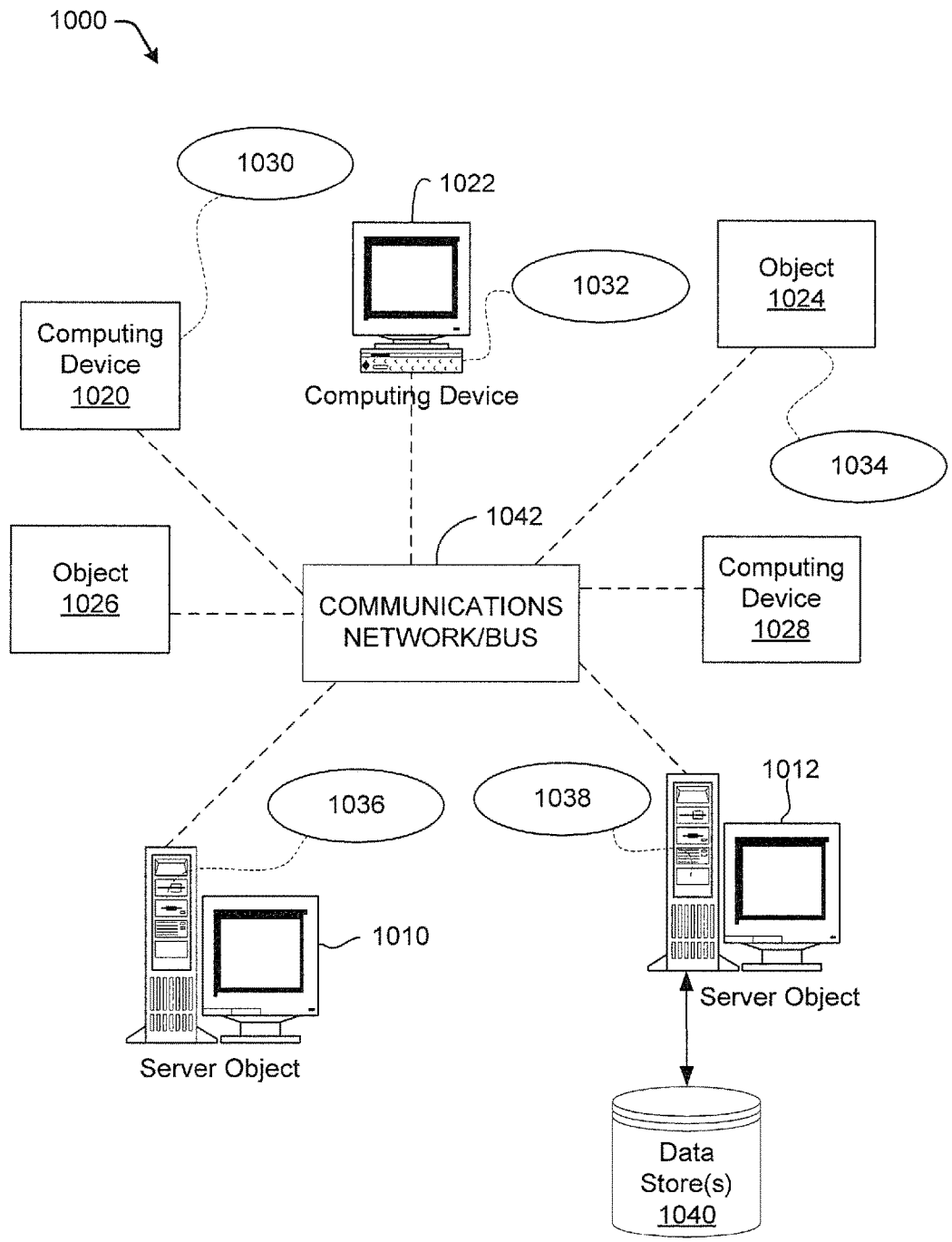
FIG. 10 depicts a block diagram of an example data communication network that can be operable in conjunction with various aspects described herein.

FIG. 10 provides a schematic diagram of an exemplary networked or distributed computing environment 1000. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1040 can include one or more cache memories, one or more registers, or other similar data stores disclosed herein.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Reference throughout this specification to "one embodiment," "an embodiment," "an example," "an implementation," "a disclosed aspect," or "an aspect" means that a particular feature, structure, or characteristic described in connection with the embodiment, implementation, or aspect is included in at least one embodiment, implementation, or aspect of the present disclosure. Thus, the appearances of the phrase "in one embodiment," "in one example," "in one aspect," "in an implementation," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the disclosed subject matter. It is, of course, not possible to describe every conceivable combination of components or methodologies for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system for analyzing timing paths for improving design timing, comprising:
   a data store that stores a design database comprising information relating to a design of integrated circuitry and defined design criteria relating to performance of the integrated circuitry; and
   a design management component that accesses the information relating to the design and determines a subset of the timing paths associated with the design that do not satisfy the defined design criteria relating to performance of the integrated circuitry based at least in part on an analysis of the timing paths associated with the design, the subset of the timing paths comprises at least a first timing path and a second timing path, and the design management component modifies at least one element associated with the subset of the timing paths to generate a modified design of the integrated circuitry that improves performance of the first timing path and the second timing path to satisfy the defined design criteria,
   wherein the design management component assigns respective correlated timing paths associated with the design as respective independent variables,
   wherein the design management component generates filtered analytics relating to the timing paths of the design based at least in part on the assignment of the respective correlated timing paths as the respective independent variables, the filtered analytics associate the respective independent variables to the respective correlated timing paths, and
   wherein the design management component stores modified design information relating to the modified design of the integrated circuitry in the design database.

2. The system of claim 1, wherein the design management component performs a static timing analysis on the design and generates static timing analysis data and variation data associated with the design based at least in part on the static timing analysis.

3. The system of claim 1, wherein the design management component determines a modification to be made to the at least one element of the design of the integrated circuitry, based at least in part on a timing path distribution, filtered analytics, or a design probability density function associated with the design, to generate the modified design of the integrated circuitry that improves the performance of at least the first timing path and the second timing path to satisfy the defined design criteria.

4. The system of claim 1, wherein the design of the integrated circuitry comprises elements, including the at least one element, the elements comprising at least one of a cell, a device, a first interconnection between the cell and the device, a second interconnection between the cell and another cell, or a third interconnection between the device and another device.

5. A system for analyzing timing paths for improving design timing, comprising:
   a data store that stores a design database comprising information relating to a design of integrated circuitry; and
   a design management component that accesses the information relating to the design and determines a subset of the timing paths associated with the design that do not satisfy defined design criteria relating to performance of the integrated circuitry based at least in part on an analysis of the timing paths associated with the design, the subset of the timing paths comprises at least a first timing path and a second timing path, and the design management component modifies at least one element associated with the subset of the timing paths to generate a modified design of the integrated circuitry that improves performance of the first timing path and the second timing path to satisfy the defined design criteria,
   wherein the design management component assigns respective correlated timing paths associated with the design as respective independent variables,
   wherein the design management component applies respective random number values to the respective independent variables of at least a portion of the timing paths of the design to generate respective sampled values for the respective timing paths, and
   wherein the design management component stores modified design information relating to the modified design of the integrated circuitry in the design database.

6. The system of claim 5, wherein the design management component generates a design probability density function relating to the design based at least in part on the respective sampled values associated with the respective timing paths.

7. The system of claim 6, wherein the design management component at least one of:
   determines a likely frequency associated with the design, based at least in part on a peak presented by the design probability density function, the likely frequency being a frequency that has a highest likelihood of correlating to a frequency yield of the design relative to other frequencies of the design,
   determines a percentage of elements of the design over a particular frequency associated with the design, based at least in part on an area under a curve representing the design probability density function, or
   facilitates matching a silicon tested frequency associated with the design, based at least in part on the curve representing the design probability density function.

8. A method for analyzing timing paths for design timing enhancement, comprising:
   storing, in a memory of a system, a design database comprising information relating to a design of an integrated circuit design of an integrated circuit;
   storing, in the memory of the system, defined design criteria relating to performance of the integrated circuit;
   determining, by a processor of the system, a subset of the timing paths associated with the integrated circuit design of the integrated circuit that do not satisfy the defined design criteria relating to performance of the integrated circuit design based at least in part on simultaneously analyzing the timing paths of the integrated circuit design, wherein the subset of the timing paths comprises at least a first timing path and a second timing path;

in response to determining that the subset of the timing paths do not satisfy the defined design criteria, modifying, by the processor of the system, at least one element associated with the subset of the timing paths to generate a modified integrated circuit design that satisfies the defined design criteria and provides an enhanced performance relative to the performance of the integrated circuit design;

assigning, by the system, respective correlated timing paths associated with the integrated circuit design as respective independent variables;

generating, by the system, filtered analytics relating to the timing paths of the integrated circuit design based at least in part on the assigning of the respective correlated timing paths as the respective independent variables, the filtered analytics link the respective independent variables to the respective correlated timing paths; and storing, in the memory of the system, modified design information relating to the modified integrated circuit design in the design database.

9. The method of claim 8, further comprising:
performing, by the system, a static timing analysis on the integrated circuit design; and
generating, by the system, static timing analysis data and variation data associated with the integrated circuit design based at least in part on the static timing analysis.

10. The method of claim 8, further comprising at least one of:
determining, by the system, a likely frequency associated with the design, based at least in part on a peak presented by a probability density function relating to the integrated circuit design, the likely frequency being a frequency that has a highest likelihood of correlating to a frequency yield of the integrated circuit design relative to other frequencies of the integrated circuit design, determining, by the system, a percentage of elements of the integrated circuit design over a particular frequency associated with the integrated circuit design, based at least in part on an area under a curve representing the probability density function, or facilitating, by the system, matching a silicon tested frequency associated with the integrated circuit design, based at least in part on the curve representing the probability density function.

11. The method of claim 8, further comprising:
determining, by the system, a modification to be made to the at least one element of the integrated circuit design, based at least in part on a timing path distribution, filtered analytics, or a probability density function associated with the integrated circuit design, to generate the modified integrated circuit design that satisfies the defined design criteria provides the enhanced performance.

12. A method for analyzing timing paths for design timing enhancement, comprising:
storing, in a memory of a system, a design database comprising information relating to a design of an integrated circuit design of an integrated circuit;
storing, in the memory of the system, defined design criteria relating to performance of the integrated circuit;
determining, by a processor of the system, a subset of the timing paths associated with the integrated circuit design of the integrated circuit that do not satisfy the defined design criteria relating to performance of the integrated circuit design based at least in part on simultaneously analyzing the timing paths of the integrated circuit design, wherein the subset of the timing paths comprises at least a first timing path and a second timing path;

in response to determining that the subset of the timing paths do not satisfy the defined design criteria, modifying, by the processor of the system, at least one element associated with the subset of the timing paths to generate a modified integrated circuit design that satisfies the defined design criteria and provides an enhanced performance relative to the performance of the integrated circuit design;

assigning, by the system, respective correlated timing paths associated with the integrated circuit design as respective independent variables;

applying, by the system, respective random number values to the respective independent variables of at least a portion of the timing paths of the integrated circuit design to generate respective sampled values for the respective timing paths; and storing, in the memory of the system, modified design information relating to the modified integrated circuit design in the design database.

13. The method of claim 12, further comprising:
generating, by the system, a probability density function relating to the integrated circuit design based at least in part on the respective sampled values associated with the respective timing paths.

* * * * *